US008316700B2

(12) United States Patent  (10) Patent No.: US 8,316,700 B2
Brusarosco et al.  (45) Date of Patent: Nov. 27, 2012

(54) METHOD AND SYSTEM FOR DETERMINING OPERATING PARAMETERS OF A TYRE DURING RUNNING OF A VEHICLE

(75) Inventors: Massimo Brusarosco, Milan (IT); Federico Mancosu, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 493 days.

(21) Appl. No.: 12/452,679

(22) PCT Filed: Jul. 18, 2007

(86) PCT No.: PCT/EP2007/006386
§ 371 (c)(1),
(2), (4) Date: Jan. 15, 2010

(87) PCT Pub. No.: WO2009/010082
PCT Pub. Date: Jan. 22, 2009

(65) Prior Publication Data
US 2010/0126263 A1  May 27, 2010

(51) Int. Cl.
*G01M 17/02* (2006.01)
(52) U.S. Cl. ......................... 73/146; 73/146.5
(58) Field of Classification Search ............... 73/146, 73/146.5
See application file for complete search history.

(56) References Cited

U.S. PATENT DOCUMENTS

| | | | |
|---|---|---|---|
| 5,260,683 A * | 11/1993 | Tanaka et al. | 340/448 |
| 5,553,491 A * | 9/1996 | Naito et al. | 73/146.5 |
| 6,539,295 B1 * | 3/2003 | Katzen et al. | 701/33.6 |
| 6,962,075 B2 * | 11/2005 | Bertrand | 73/146 |
| 7,404,317 B2 * | 7/2008 | Mancosu et al. | 73/146 |
| 7,415,874 B2 * | 8/2008 | Mancosu et al. | 73/146.5 |
| 7,549,327 B2 * | 6/2009 | Breed | 73/146 |
| 7,552,628 B2 * | 6/2009 | Mancosu et al. | 73/146 |
| 7,856,871 B2 * | 12/2010 | Mancosu et al. | 73/146.5 |
| 7,908,918 B2 * | 3/2011 | Brusarosco et al. | 73/146.5 |
| 7,945,361 B2 * | 5/2011 | Brusarosco et al. | 701/36 |
| 7,954,367 B2 * | 6/2011 | Mancosu et al. | 73/146 |
| 8,051,705 B2 * | 11/2011 | Kobayakawa | 73/146 |
| 2003/0058118 A1 * | 3/2003 | Wilson | 340/679 |
| 2007/0295069 A1 | 12/2007 | Mancosu et al. | |

FOREIGN PATENT DOCUMENTS

| | | |
|---|---|---|
| EP | 1 650 057 A2 | 4/2006 |
| WO | WO-2005/005950 A1 | 1/2005 |

(Continued)

OTHER PUBLICATIONS

International Search Report from the European Patent Office for International Application No. PCT/EP2007/006386 (Mar. 26, 2008).

*Primary Examiner* — Freddie Kirkland, III
(74) *Attorney, Agent, or Firm* — Finnegan, Henderson, Farabow, Garrett & Dunner, L.L.P.

(57) ABSTRACT

An oscillating structure is coupled to a crown portion of a tire. The oscillating structure includes a housing and a piezoelectric element coupled to the housing. The piezoelectric element is able to oscillate in an oscillation direction, which could match either a longitudinal or a radial direction of the tire. An electrical signal generated by the piezoelectric element is processed so as to determine at least one operating parameter of the tire. The processing includes determining whether a rotation speed of the tire is greater than a threshold speed; and, in the negative, extracting information for determining the at least one operating parameter of the tire from a low-pass filtered signal. Such low-pass filtered signal is obtained by removing at least frequency components of the electrical signal having a frequency higher than or equal to a resonance peak frequency of the oscillating structure.

52 Claims, 12 Drawing Sheets

FOREIGN PATENT DOCUMENTS

| | | |
|---|---|---|
| WO | WO-2005/042281 A1 | 5/2005 |
| WO | WO-2005/067073 A1 | 7/2005 |
| WO | WO-2006/072539 A2 | 7/2006 |
| WO | WO 2007/121768 A1 | 11/2007 |

* cited by examiner

METHOD AND SYSTEM FOR DETERMINING OPERATING PARAMETERS OF A TYRE DURING RUNNING OF A VEHICLE

CROSS REFERENCE TO RELATED APPLICATION

This application is a national phase application based on PCT/EP2007/006386, filed Jul. 18, 2007, the content of which is incorporated herein by reference.

FIELD OF THE INVENTION

The present invention relates to a method and a system for determining at least one operating parameter of a tyre fitted on a vehicle. Said at least one operating parameter may be, for example, a length of the contact region between the tyre and the rolling surface on which the tyre is rolling (or contact patch), and/or a load to which a tyre fitted on the vehicle is subjected, during running of the vehicle.

BACKGROUND OF THE INVENTION

The incorporation of electronic devices within pneumatic tyres is taking a greater importance in order to increase safety of vehicles. Tyre electronics may include sensors and other components suitable for obtaining information regarding the behavior of a tyre, as well as various physical parameters thereof, such as for example temperature, pressure, number of tyre revolutions, vehicle speed, etc. Such information may become useful in tyre monitoring and/or alarm systems. Furthermore, active control systems of the vehicle may be based on information sent from sensor devices included within the tyres. Typically, wireless transmission is employed in order to send tyre performance information outside the tyre, to a receiver disposed on the vehicle, so that such electronic devices disposed within the tyre typically include a transmitter associated to an antenna. A microprocessor is also typically employed, in order to collect and process the signals coming from the performance sensors, before transmission.

An important parameter to be monitored for a proper use of a tyre is the load to which the tyre is subjected when fitted on a vehicle. This operating parameter of the tyre is very important in order to correctly set the inflation pressure of the tyre, as well as in order to correctly tune active control systems of vehicles. Another important parameter is the length of the contact patch, i.e. of the contact region between the tyre and the road surface.

WO 05/005950 discloses a method for determining a load exerted on a tyre fitted on a vehicle by measuring the amplitude of the deformation in radial direction to which a portion of the tread area of the tyre is subjected when such portion passes in correspondence of the contact region between the tyre and the road ("radial deformation"), and by relating such amplitude to the rotation speed and to the inflation pressure of the tyre. In the embodiments disclosed in WO 05/005950, the radial deformation is detected by means of a radial accelerometer secured to the inner liner of the tyre.

WO 05/042281 discloses a method for determining a load exerted on a tyre fitted on a vehicle during a running of said vehicle on a rolling surface, comprising providing a concave upwards function $F_z = F_z(PL_c)$ of said tyre load versus a length $(PL_c)$ of a contact region between said tyre and said rolling surface; estimating said length substantially at the equatorial plane; and deriving the tyre load corresponding to said estimated length from said function. In the embodiments disclosed in WO 05/042281, the contact length is estimated by acquiring a tangential acceleration signal from a tangential accelerometer, and by measuring a distance between a maximum value and a minimum value of said tangential acceleration signal.

Integrated tyre electronics systems have conventionally been powered by a variety of techniques and different power generation systems.

A typical solution for powering tyre electronics systems is the use of a non-rechargeable battery, which may cause inconveniences to a tyre user since proper electronics system operation is dependent on periodic battery replacement. As a matter of fact, batteries tend to deplete their energy storage quite rapidly when powering electronic applications characterized by complex levels of functionality. Furthermore, conventional batteries typically contain heavy metals that are not environmentally friendly and which present disposal concerns. Moreover, performances of conventional batteries are often influenced by temperature: in particular, the functioning of such batteries is not reliable at low temperatures.

Another known method for powering tyre monitoring systems is a coupling of radio-frequency (RF) power between an antenna disposed on the vehicle in close proximity with another antenna included within the electronic device disposed in the tyre. This typically requires antennas disposed in vehicle portions frequently exposed to damage from road hazards, and thus may lead to many drawbacks.

The use of piezoelectric elements has also been proposed for powering tyre monitoring systems. Piezoelectricity is a property of certain materials, such as quartz, Rochelle salt, and certain solid-solution ceramic materials such as lead-zirconate-titanate (PZT), of generating electrical charge when mechanically stressed.

WO 2005/067073 discloses a tyre comprising a piezoelectric flexing element associated with an energy storage device (e.g. a capacitor). The piezoelectric flexing element is mounted in cantilever fashion in a housing so as to be positioned substantially along a plane orthogonal to a radial direction of said tyre and, so that a first end of the piezoelectric element is restrained to the housing. A loading mass is coupled to the second end of the piezoelectric flexing element. A small gap is formed between the inner walls of the housing and the outer surface of the loading mass, in order to allow limited flexure of the piezoelectric element. The housing including the piezoelectric element is mounted in a tyre portion in correspondence of a tread area of the tyre, preferably on the inner surface of the tyre. The piezoelectric element flexes under the action of the radial acceleration when the tyre rotates. The loading mass and the gap are chosen to obtain: a) small entity oscillations of the flexure element substantially during a complete revolution of the tyre, when the tyre rotates at low speed; b) large entity oscillations of the flexure element substantially only during the passage of the tyre portion including the piezoelectric element in the contact patch.

WO 2006/072539 discloses a configuration of a spring element as a rod spring, torsion spring or leaf spring, in which the free end of the spring element carries a seismic mass, to which an impulse is applied by the rolling of the tyre. The combination of the seismic mass with the spring element produces a spring-mass oscillator. Oscillation is generated by the motion whereby the tyre module, during the rotation of the tyre, describes a straight line as it passes through the contact area, and a circular path as it moves out of the contact area. In the circular path, centrifugal force acts on the seismic mass whereas, under ideal conditions, no force will act on the seismic mass in the contact area. Centrifugal force will displace the spring-mass oscillator, which will then return to its position of rest as it passes through the contact area. According to WO 2006/072539, in order to produce a complete module for the recording of tyre condition variables, an analysis unit for the evaluation of electrical output signals from the conversion unit, or other sensor data, can be connected to the conversion unit. It is then possible, e.g. on the basis of the time interval between two acceleration pulses, to determine the length of the contact area, i.e. the size of the tyre contact surface. According to WO 2006/072539, it is also possible to determine the speed of rotation of the wheel, or the wheel load.

SUMMARY OF THE INVENTION

The Applicant has verified that the coupling of an oscillating structure comprising a piezoelectric element to a tyre may advantageously lead to provide a fine-working self-powered sensor system suitable for determining operating parameters of the tyre, such as the length of the contact region between the tyre and the road surface, and/or the load to which the tyre is subjected when fitted on a vehicle.

In particular, the coupling of the piezoelectric element in the crown region of the tyre (e.g. to the inner surface of the tyre, substantially in correspondence of the equatorial plane of the tyre) may cause oscillation of the piezoelectric element, leading to the generation an electrical signal. The generated electrical signal carries electrical energy that could be stored for being used for energizing electronic circuits and/or devices (e.g. a wireless transmitter and/or a pressure sensor). Moreover, the generated electrical signal carries information related to the interaction between the tyre and the road surface, so that an analysis of the generated electrical signal could lead to determine operating parameters of the tyre.

Thus, the coupling of a flexible piezoelectric element to a tyre appears to be a very promising solution for the provision of a self-powered tyre sensing system.

However, the Applicant has found that some peculiarities due to the use of an oscillating piezoelectric element for providing both electrical energy for energizing electronic circuits and an electrical signal to be analyzed (in order to determine information related to the interaction between the tyre and the road surface) have to be taken into proper account in order to perform a correct analysis of the generated electrical signal. The Applicant has found that resonances of the oscillating structure comprising the piezoelectric element may arise at low rotation speed of the tyre. The arising of resonances significantly affects the electrical signal generated at low speed by the oscillating piezoelectric element, so that the components of the generated signal purely related to the interaction between the tyre and the road surface may be covered or disturbed. In other words, the arising of resonances may lead to an incorrect determination of the desired operating parameters when the tyre rotates at low speed, if not taken into proper account.

In a first aspect, the invention relates to a method for determining at least one operating parameter of a tyre fitted on a vehicle. The method comprises:
- providing an oscillating structure comprising a housing and a piezoelectric element coupled to said housing and being able to oscillate in an oscillation direction;
- coupling said oscillating structure to a crown portion of said tyre;
- rotating said tyre on a rolling surface so as to cause oscillation of said oscillating structure, thereby causing said piezoelectric element to generate an electrical signal;
- processing said electrical signal so as to determine said at least one operating parameter of the tyre;

wherein said processing of said electrical signal comprises:
- determining whether a rotation speed of said tyre is greater than a threshold speed;
- in the negative, extracting information for determining said at least one operating parameter of the tyre from a low-pass filtered signal, the low-pass filtered signal being obtained by removing at least frequency components of said electrical signal having a frequency higher than or equal to a resonance peak frequency of said oscillating structure.

In a second aspect, the invention relates to a system for determining at least one operating parameter of a tyre fitted on a vehicle comprising:
- an oscillating structure coupled to a crown portion of said tyre, the oscillating structure comprising a housing and a piezoelectric element coupled to said housing and being able to oscillate in an oscillation direction;
- a processing device adapted to process an electrical signal generated by said piezoelectric element so as to determine said at least one operating parameter of the tyre;

wherein said processing device comprises an analysis circuit adapted to:
- determine whether a rotation speed of said tyre is greater than a threshold speed;
- in the negative, extract information for determining said at least one operating parameter of the tyre from a low-pass filtered signal, the low-pass filtered signal being obtained by removing at least frequency components of said electrical signal having a frequency higher than or equal to a resonance peak frequency of said oscillating structure.

The present invention, in at least one of the abovementioned aspects, may show one or more of the preferred characteristics hereinafter described.

The piezoelectric element may be coupled to the housing so as to have a first end substantially fixed to the housing and a second end fixed to a loading mass. In such configuration, the center of mass of the oscillating structure could be advantageously shifted towards the second end of the piezoelectric element being free to oscillate, with an effective generation of electrical charge.

A gap can be formed between at least one inner wall of the housing and an outer surface of the loading mass. In such configuration, oscillation of the piezoelectric element could be advantageously limited to a maximum extent, so as to obtain a reliable structure.

The crown portion of the tyre to which the oscillating structure is coupled may be a portion of the inner surface of the tyre. This advantageously facilitates the coupling of the oscillating structure to the tyre.

The coupling of the oscillating structure to the crown portion of the tyre can be performed so as to dispose a longer side of the piezoelectric element substantially according to an axial direction of the tyre. This configuration minimizes the stress to which the piezoelectric element could be subjected during rotation of the tyre, with an advantageous result in terms of reliability.

The coupling of the oscillating structure to the crown portion of the tyre can be performed so as to substantially match the oscillation direction of the oscillating structure with a longitudinal direction of the tyre. In such configuration, the generated electrical signal strongly depends on the rotation versus of the tyre (clockwise or counter-clockwise), so that an auto-location of the tyre comprising the oscillating structure could be simply performed based on the processing of the electrical signal.

Alternatively, the coupling of the oscillating structure to the crown portion of the tyre can be performed so as to substantially match the oscillation direction of the oscillating structure with a radial direction of the tyre. In such configuration, the generated electrical signal presents well defined peaks, which could be easily detected and analyzed.

In case the rotation speed is higher than the threshold speed, the extraction of information useful for determining the at least one operating parameter of the tyre can be performed directly on the generated electrical signal (without any filtering). This advantageously simplifies the processing of the signal when resonances of the oscillating structure give less significant contribution.

The processing of the low-pass filtered electrical signal or of the (unfiltered) electrical signal is typically performed so as to extract information related to at least one characteristic peak of the low-pass filtered signal or of the (unfiltered) electrical signal. The at least one characteristic peak is related to an entering of the crown portion of said tyre coupled to the oscillating structure in a contact region between the tyre and a rolling surface, and to an exiting of the crown portion of said tyre coupled to the oscillating structure from said contact region.

For example, information related to said at least one characteristic peak may comprise a distance between predetermined points of said at least one characteristic peak.

For example, a length of the contact region between the tyre and the rolling surface could be determined based on the extracted distance between predetermined points of said at least one characteristic peak.

In case the oscillating structure is coupled to the crown portion of the tyre so that the oscillation direction substantially matches the longitudinal direction, the generated electrical signal (or the low-pass filtered signal) comprises a positive characteristic peak and a negative characteristic peak, and the processing of said electrical signal (or of said low-pass filtered signal) can be performed so as to extract information related to said positive and said negative characteristic peaks. For example, information related to the positive and the negative characteristic peaks may comprise a sequence of signs of said positive and said negative characteristic peaks.

For example, a fitting position of the tyre on the vehicle (right-hand side or left-hand side) could be simply and effectively determined based on the extracted sequence of signs of the positive and the negative characteristic peaks.

As another example, a number of tyre revolutions performed by said tyre during rolling in a given time period could be determined by counting an occurrence of said at least one characteristic peak during the given time period.

The inflation pressure of the tyre could also be measured in the method and/or in the system of the invention.

A load to which said tyre is subjected could also be determined, based on the distance between predetermined points of said at least one characteristic peak and on the measured inflation pressure.

The tuning frequency of the low-pass filter used for filtering the electrical signal could be appropriately chosen by the skilled in the art according to the needs. For example, the low-pass filtered signal could be obtained by removing frequency components having a frequency higher than or equal to half the resonance peak frequency of the oscillating structure.

In preferred embodiments, the oscillating structure could be designed so as to have a resonance peak frequency higher than 150 Hz, more preferably higher than 200 Hz, even more preferably higher than 300 Hz.

For example, with the above mentioned values of resonance peak frequency, the low-pass filtered signal could be obtained by removing frequency components having a frequency higher than 120 Hz.

The determination of whether the rotation speed of the tyre is greater than the threshold speed may be performed by detecting a condition of maximum allowed oscillation of said oscillating structure (due to the presence of the gap). This advantageously allows a "self tuning" of each assembly comprising the oscillating structure and the processing device, so as to reduce (or even avoid) dependency on variability in the manufacturing process of each assembly, and complex characterizations of each assembly.

In order to avoid excessive stress on the piezoelectric element, the loading mass coupled to the second end thereof could be chosen to be lower than 4 grams. The loading mass could be U-shaped, so as to maximize the shifting of the center of mass of the oscillating structure towards the second end of the piezoelectric element.

The gap could have an overall maximum extent of 400 μm, in order to reduce the probability of cracking formation in the piezoelectric element. The "overall maximum extent" of the gap is intended to be the sum of all the distances (in the oscillation direction) between the loading mass sides and the inner walls of the housing when the oscillating structure is at the equilibrium position.

The piezoelectric element could exemplarily be a bimorph element. In preferred embodiments, the piezoelectric element is a planar element.

A transmitter device is typically coupled to the processing device, for transmitting the at least operating parameter of the tyre determined by the processing device to a receiving device (external to the tyre).

Further operating parameters of the tyre could be determined. For example, the inclusion of a temperature sensor could provide a measurement of the temperature during rolling of the tyre. As another example, the inclusion of an acceleration sensor could also be provided.

In preferred embodiments, a voltage preparation circuit adapted for storing electrical energy associated with the electrical signal generated by the piezoelectric element is coupled to the oscillating structure and to the processing device. The voltage preparation circuit typically comprises a capacitor.

BRIEF DESCRIPTION OF THE DRAWINGS

Further features and advantages of the present invention will be made apparent by the following detailed description of some exemplary embodiments thereof, provided merely by way of non-limiting examples, description that will be conducted by making reference to the attached drawings, wherein.

DETAILED DESCRIPTION OF EXEMPLARY EMBODIMENTS OF THE INVENTION

Figure 1:
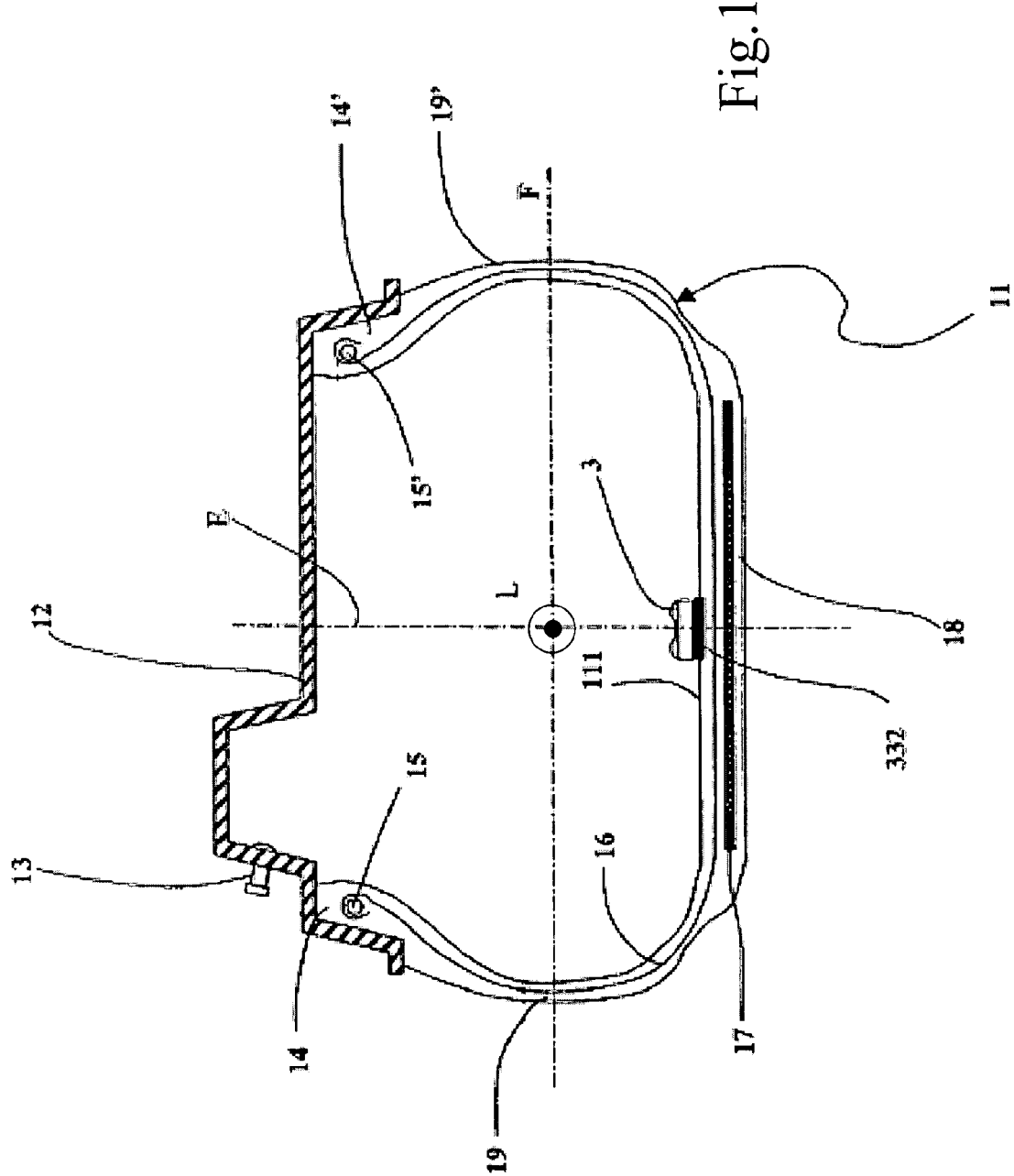
FIG. 1 shows a cross section of an exemplary tyre comprising a self-powered sensor device according to the invention.

FIG. 1 shows a cross section of a wheel comprising a tyre 11 and a supporting rim 12. The tyre 11 shown in FIG. 1 is of a type conventionally known as "tubeless", i.e. it does not include an inner tube. This tyre can be inflated by means of an inflation valve 13 fitted on the said rim 12.

The tyre 11 includes a carcass 16, terminating in two beads 14 and 14', each formed along an inner circumferential edge of the carcass 16, for fixing the tyre 11 to the supporting rim 12. The beads 14, 14' comprise respective reinforcing annular cores 15 and 15', known as bead cores. The carcass 16 is formed by at least one reinforcing ply, including textile or metallic cords, extending axially from one bead 14 to the other 14' in a toroidal profile, and having its ends associated with a respective bead core 15 and 15'. In tyres of the type known as radial, the aforesaid cords lie essentially in planes containing the axis of rotation of the tyre. An annular structure 17, known as belt structure, is placed in a radially external position with respect to the carcass 16. Typically, the belt structure 17 includes one or more strips of elastomeric material incorporating metal and/or textile cords, overlapping with each other. A tread band 18 is wound around the belt structure 17 for the rolling contact of the tyre with the ground. The tread band is typically impressed with a relief pattern. Two sidewalls 19 and 19', each radially extending outwards from the outer edge of the corresponding bead 14 and 14', are also placed on the carcass 16 in axially opposed lateral positions. In tubeless tyres the inner surface of the carcass 16 is normally covered with a liner 111, i.e. with one or more layers of air-impermeable elastomeric material. Other known elements, such as for example bead fillers may be provided, according to the specific design of the tyre 11.

A self-powered sensor device 3 is included within the tyre 11. The sensor device 3 is coupled to a crown portion of the tyre 11, i.e. in a portion of the tyre 11 axially extending between the sidewalls of the tyre 11. Preferably, the sensor device 3 is disposed substantially in correspondence of the equatorial plane of the tyre 11. In the preferred embodiment shown in FIG. 1, the sensor device 3 is secured to the inner liner 111 of the tyre 11. A fixing element 332 adheres both to the sensor device 3 and to the inner liner 111. The fixing element 332 provides the securing of the sensor device 3 to the inner liner 111 of the tyre, and is adapted to comply with the deformations undergone by the tyre structure during rolling, in order to stably maintain the securing of the sensor.

A preferred embodiment of a fixing element 332 adapted for maintaining stable securing of the sensor device 3 to the tyre is described in the PCT patent application no. 2006WO-EP003844 in the name of the Applicant, which is incorporated herein by reference. In such embodiment the fixing element (named "anchoring body" in PCT patent application 2006WO-EP003844) comprises at least two portions made of an elastomeric material. Each portion has a fastening surface, to be secured to the internal surface of the tyre 11, and a retaining sub-portion. The sensor 3 is arranged between the two retaining portions. An antenna having an annular shape and being associated with the sensor (see below) may be disposed in a groove formed between the fastening surface and the retaining sub-portion of each portion, so that the engagement between the inner perimetral edge of the antenna and the groove formed in each portion maintains a constraint between the sensor 3 and the fixing element 332.

In alternative embodiments, the sensor device 3 may be incorporated within the structure of the tyre in the tread area, for example within the tread band, or between the outer belt strip and the tread band.

Figure 2:
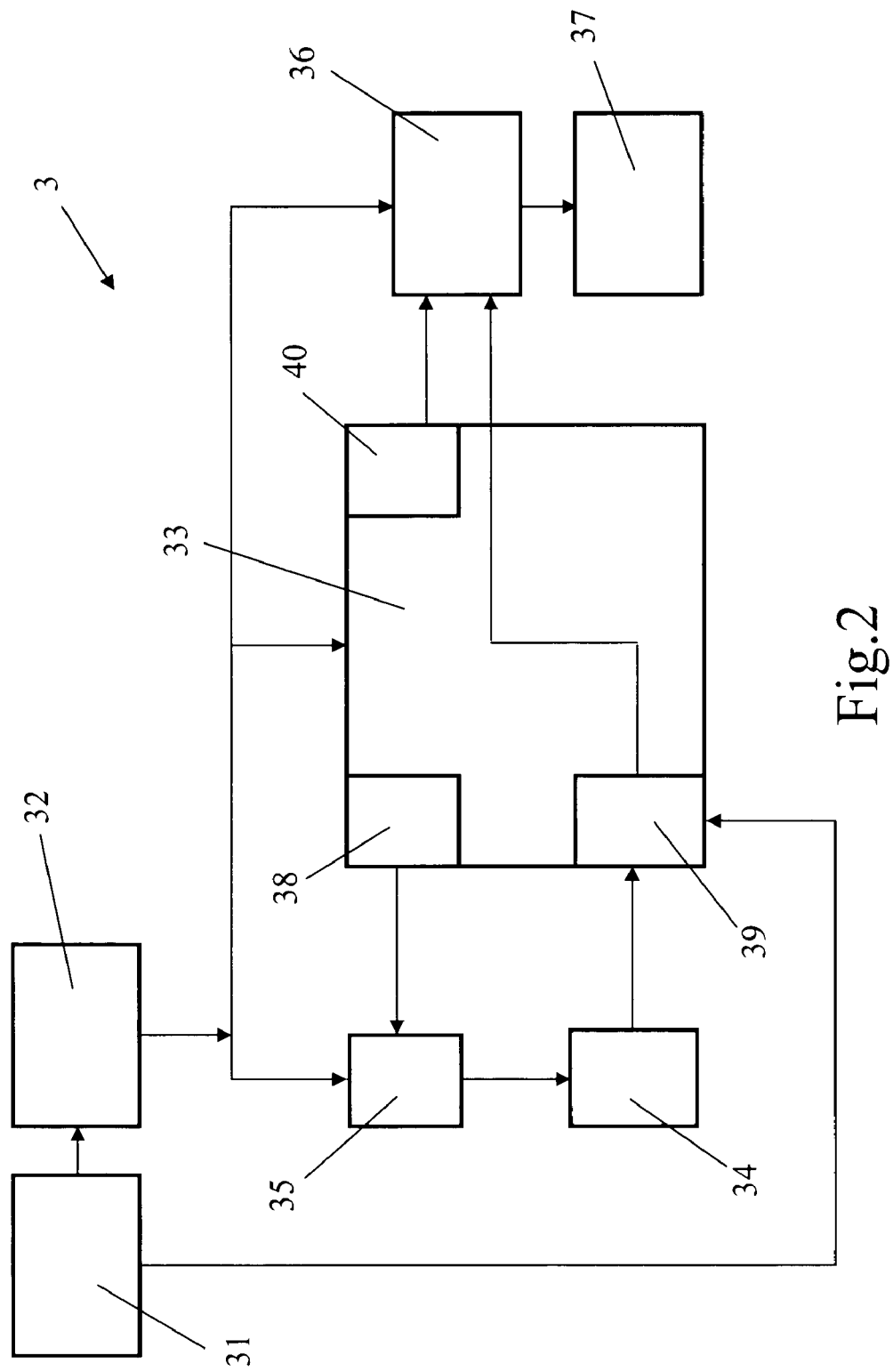
FIG. 2 shows an exemplary scheme of a self-powered sensor device to be included in the tyre of FIG. 1.

A scheme of an exemplary self-powered sensor device 3 is shown in FIG. 2. The sensor device 3 comprises a power supply 31, a micro-controller 33, a measurement device 34, a radio-frequency transmitter 36, an antenna 37.

The power supply 31 comprises a flexible piezoelectric element, as it will be described in detail in the following, which deforms under the forces transmitted to it by the tyre during rolling on the road. Due to piezoelectric effect, such deformations generate an electrical signal, which can be collected by suitable electrodes and fed to a voltage preparation circuit 32, typically including a diode rectifier bridge (not shown), being adapted to transform an alternate current in a direct current. The voltage preparation circuit 32 also includes a capacitor (not shown), suitable for storing the electrical charge generated by piezoelectric effect and carried by the electrodes. The voltage preparation circuit 32 may also comprise a voltage controller (not shown), being adapted to verify that a voltage across the capacitor is above a predetermined minimum voltage (e.g. 2.7 Volt).

The electrical power generated by the power supply 31 and stored in the voltage preparation circuit 32 is fed to the micro-controller 33, to the measurement device 34 (via switch 35) and to the radio-frequency transmitter 36.

Furthermore, the electrical signal generated by the deformations of the flexible piezoelectric element is also directly fed towards the micro-controller 33, in order to allow an analysis of the same devoted to the extraction of information related to the interaction between the tyre and the road surface and to some operating parameters of the tyre, such as the length of the contact patch and/or the load to which the tyre is subjected.

The measurement device 34 comprises at least one sensor adapted to measure other operating tyre parameters to be monitored, such as for example pressure and/or temperature. The measurement device 34 also includes control circuitry adapted to transform the sensed parameters in electrical signals.

The radio-frequency device 36 is adapted to transmit, via the antenna 37, information frames containing the measured parameter or parameters, to a receiver (not shown) external to the tyre, typically located on the vehicle to which the tyre is fit.

The micro-controller 33 typically comprises a CPU that controls operation of the sensor device 3. In the preferred embodiment shown in FIG. 2, the micro-controller 33 enables, via a first timing/enabling circuit 38, the switch 35 to close the circuit towards the measurement device 34, in order to energize the same for carrying out the measurement of the characteristic parameter or parameters to be monitored. Furthermore, the micro-controller 33 enables, via a second timing/enabling circuit 40, the transmission of the frames to the external receiver. Moreover, the micro-controller 33 collects the signals coming from the power supply 31 and from the measurement device 34, and processes the signals, via an analysis circuit 39, in order to extract the information to be sent outside the tyre via the radio-frequency transmitter 36. For the purposes of the present invention, the term "circuit" referred to the first timing/enabling circuit 38, to the analysis circuit 39, to the second timing/enabling circuit 40 should not be construed in a limiting way: in order to perform the associated function, the circuits 38, 39, and 40 could be realized either in hardware (by suitable electronics), or in software (by suitable program routines), or in a combination of hardware and software.

The enabling of the closure of the switch 35, as well as the enabling of the frame transmission by transmitter 36, may be performed at predetermined time intervals. For example, the first timing/enabling circuit 38 may drive the closure of the switch 38 every two minutes, whereas the second timing/enabling circuit 40 may enable transmission of collected data to the outside every seven minutes, since radio-frequency transmission typically requires more power with respect to parameter measurements.

As another example, the closure of the switch 38 and/or the transmission of collected data may be enabled when the voltage across the capacitor included in the voltage preparation circuit 32 is above a predetermined threshold voltage. The first and/or second timing/enabling circuits 38, 40 may be realized in any conventional manner, as hardware circuits separate from the micro-controller 33, or as firmware objects integrated within the memory of the micro-controller 33.

Figure 3:
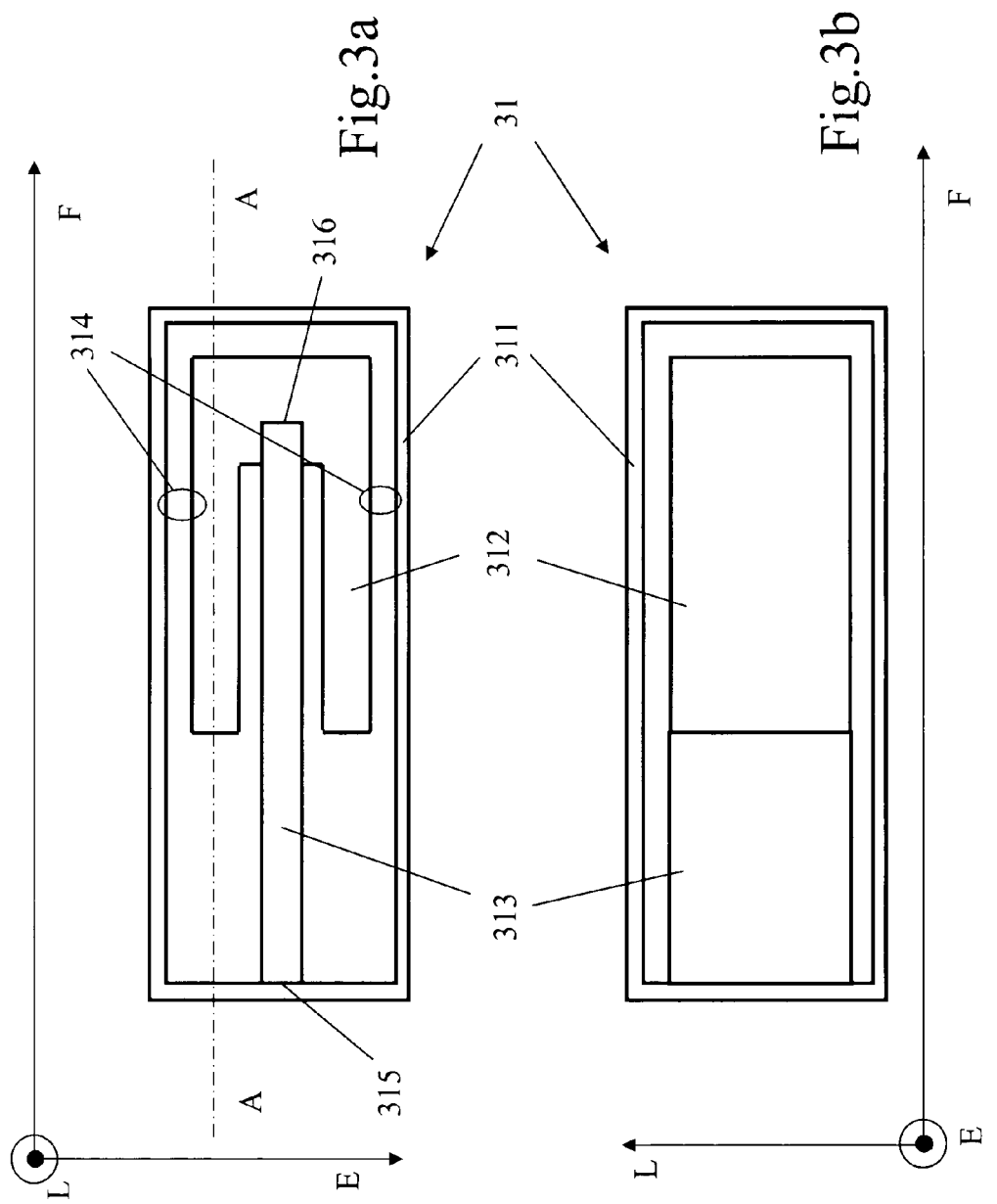
FIGS. 3a and 3b show an exemplary flexible piezoelectric element to be included in the sensor device of FIG. 2 for power supply, according to a first arrangement.
Figure 4:
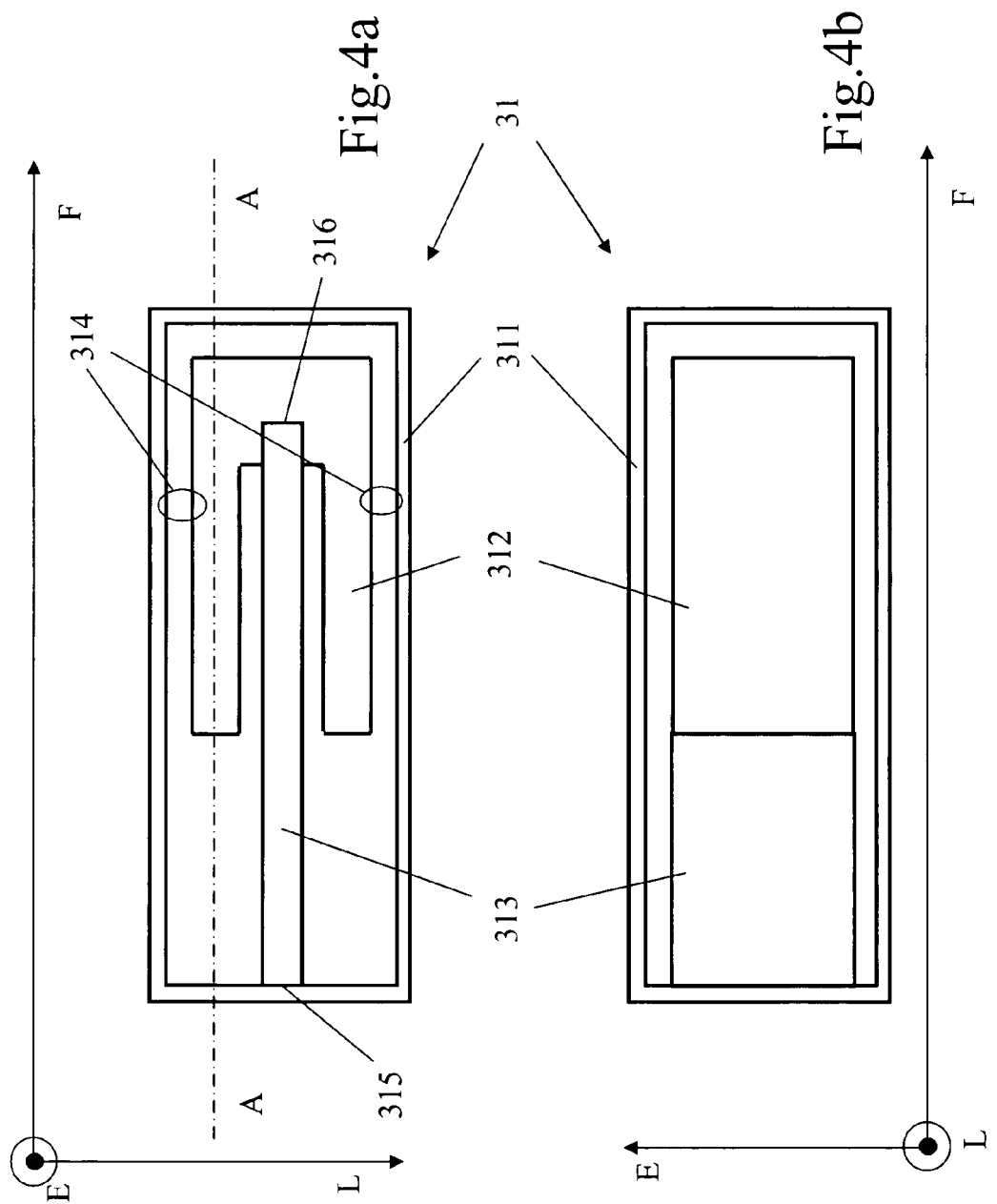
FIGS. 4a and 4b show an exemplary flexible piezoelectric element to be included in the sensor device of FIG. 2 for power supply, according to a second arrangement, alternative to the first arrangement.

FIGS. 3a and 4a show a cross-section of a power supply 31 according to one embodiment of the invention. The power supply 31 comprises a housing 311, a flexible piezoelectric element 313 and a loading mass 312 associated to the piezoelectric element. FIGS. 3b and 4b show a view of the power supply 31 along the section indicated as A-A in FIGS. 3a, 4a, respectively.

With reference to FIGS. 3a, 4a, the piezoelectric element 313 is disposed within the housing in cantilever-beam fashion. In other words, the piezoelectric element 313 is fixed at a first end 315 thereof to the housing 311, whereas the second end 316 is associated to the loading mass 312. The piezoelectric element 313 is preferably formed as a planar element. Alternatively, it can be formed as a bar element. In preferred embodiments, a planar piezoelectric element comprises at least two planar piezoelectric crystals, separated by a planar, electrically conductive (e.g., metallic) plate (bimorph configuration). Electrodes are conventionally disposed on the outer surfaces of the piezoelectric elements.

In the arrangement shown in FIGS. 3a, 3b the power supply 31 is coupled to the tyre so as to substantially match the oscillation direction of the flexible piezoelectric element 313 with a radial direction of the tyre (indicated as "E" in FIGS. 1, 3a, 3b), i.e. a direction orthogonal to the rotation axis of the tyre. In such way, the piezoelectric element 313 and the associated loading mass 312 are subjected, during rolling of the tyre, to the radial acceleration. In order to uniformly distribute the stress undergone by the piezoelectric element 313, the longer side of the piezoelectric element 313 may be preferably disposed substantially according to an axial direction of the tyre (indicated as "F" in FIGS. 1, 3a, 3b), i.e. a direction parallel to the rotation axis of the tyre.

In the alternative arrangement shown in FIGS. 4a, 4b the power supply 31 is coupled to the tyre so as to substantially match the oscillation direction of the flexible piezoelectric element 313 with a longitudinal (or circumferential) direction of the tyre (indicated as "L" in FIGS. 1, 4a, 4b). In such way, the piezoelectric element 313 and the associated loading mass 312 are subjected, during rolling of the tyre, to the longitudinal acceleration. In order to uniformly distribute the stress undergone by the piezoelectric element 313, the longer side of the piezoelectric element 313 may be preferably disposed substantially according to an axial direction of the tyre (indicated as "F" in FIGS. 1, 4a, 4b), i.e. a direction parallel to the rotation axis of the tyre.

The geometrical dimensions of the flexible piezoelectric element 313, of the loading mass 312 and of the housing 311 are chosen so as to leave an interspace 314, also called "gap" in the remainder of the description, between the outer surface of the loading mass 312 and at least one of the inner walls of the housing 311. The gap defines a maximum deflection allowed to the flexible piezoelectric element 313. In order to limit the dimensions of the power supply 31 and to shift the center of mass of the structure comprising the piezoelectric element 313 and the loading mass 312 substantially at the free end of the piezoelectric element 313, the loading mass 312 may preferably be U-shaped, as shown in FIGS. 3a, 4a.

In operation, the power supply 31 is subjected to the forces/accelerations which develop due to the tyre rotation. The centrifugal acceleration is particularly high, but it is also mixed with other acceleration contributions coming from the interaction of the tyre with the road surface during rolling, and that generally have a lower intensity with respect to the centrifugal acceleration contribution (particularly at high speed). In particular, an acceleration contribution in the longitudinal direction of the tyre (i.e. the circumferential direction) is also imparted to the power supply 31, due to the entering and exiting from the contact patch of the tyre portion associated therewith at any tyre revolution.

Figure 5:
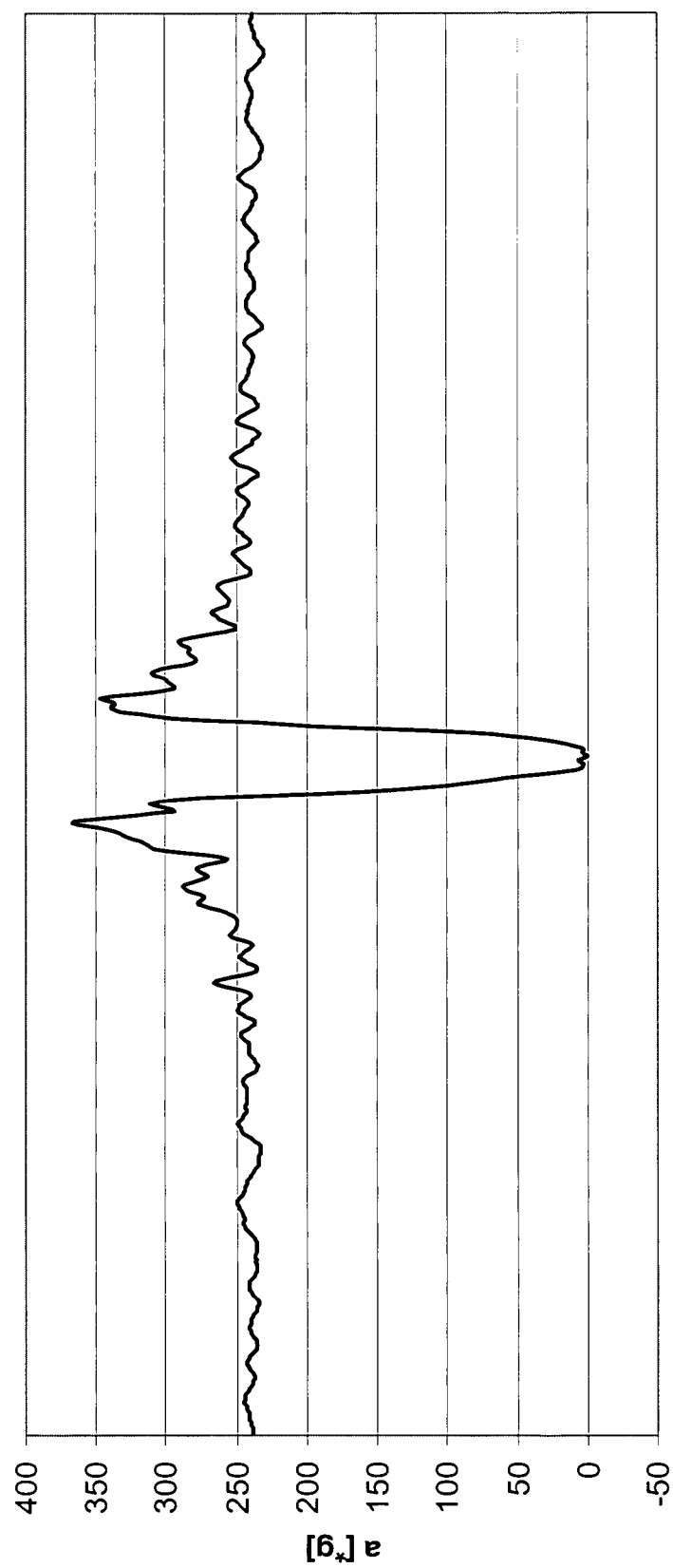
FIG. 5 shows an exemplary profile of radial acceleration to which a crown portion of a tyre is subjected during rolling on road surface.

FIG. 5 shows an exemplary profile of a resulting radial acceleration versus time to which the tyre portion associated with the power supply 31 may be subjected during a complete tyre revolution.

During a first fraction of the complete tyre revolution, during which the crown portion associated with the power supply 31 is not in contact with the ground, the acceleration is substantially constant, except for the ripples visible in FIG. 5, the presence of which will be explained in the following, and assumes a value depending on the square of the tyre rotation speed.

During a second fraction of the complete tyre revolution, during which the crown portion associated with the power supply 31 is in contact with the ground, the acceleration level drops to substantially zero, as it can be seen in the central portion of FIG. 5, after an initial increase due to a deformation to which the tyre is subjected during the passage from a circumferential to a flat configuration, at the very beginning of the contact region between the tyre and the ground. A further increase of the acceleration level is encountered by the tread area at the exit of the contact region.

During the above mentioned first fraction of tyre revolution, the power supply 31 is subjected to a tremendous radial acceleration, that can reach values of several hundreds g at high speed (e.g. 360 g at 120 km/h, being g the gravity acceleration).

In the arrangement of FIGS. 3a, 3b, the loading mass 312, being subject to this acceleration which is directed substantially along direction E, is pushed away from a first equilibrium position, in which the piezoelectric element 313 is practically orthogonal to a radial direction of the tyre, towards the inner walls of the housing 311. In particular, the loading mass 312 is pushed away to an extent that is dependent on the compliance characteristics of the flexible piezoelectric element 313 and on the size of the loading mass 312. A maximum extent is anyway defined by the dimension of the gap 314.

The movement of the loading mass 312 causes a corresponding flexing of the piezoelectric element 313, i.e., generation of electric charge due to piezoelectric effect. However, under this "static" acceleration, the generation of electric charge is suddenly interrupted as soon as the loading mass reaches a second equilibrium position, which may be within the gap 314 or against the inner walls of the housing 311, depending on the acceleration value, i.e. on the tyre rotation speed. The more the rotation speed, the more the second equilibrium position is far from the first equilibrium position, up to a maximum defined by the gap 314.

On the other hand, during the above mentioned second fraction of complete tyre revolution, i.e. during the contact of the crown portion associated with the power supply 31 with the ground, the loading mass 312 is left free to oscillate, due to the fact that the radial acceleration drops to substantially zero, so that no force acts anymore to keep the loading mass 312 in the second equilibrium position. The oscillations of the loading mass 312 cause a corresponding flexing of the flexible piezoelectric element 313, i.e. generation of electric charge, due to piezoelectric effect. These oscillations may furnish a high quantity of electric charge, in dependence of the extent of the oscillation and of the damping effect imposed from the damping characteristics of the flexible piezoelectric element 313. However, as soon as the passage in the contact region between the tyre and the ground terminates, the radial acceleration increases abruptly, then causing a forced stopping of the oscillations, with a positioning of the loading mass at the second equilibrium position, and a corresponding stopping of the generation of electric charge.

The behavior of the piezoelectric element 313 associated with the loading mass 312 explained hereinabove for the arrangement of FIGS. 3a, 3b refers to a so-called "first harmonic" contribution of the radial acceleration to which the power supply 31 is subjected, i.e. a contribution that occurs once per tyre turn. The frequency associated to such contribution may vary in a low frequency range from 0 Hz to few tens of Hz, depending on the tyre rotation speed (e.g. about 20-25 Hz, for a car tyre at a speed around 150 km/h), corresponding to the number of passages per second of the tyre portion associated with the power supply 31 under the contact patch. Due to such low frequency contribution, a "pulsed" generation of electric charge may be obtained, as a result of the "pulsed" oscillating behavior of the flexible piezoelectric element 313, with a "pulse frequency" depending on the tyre rotation speed.

However, the actual acceleration to which the power supply 31 is subjected in radial direction has also components in frequency ranges higher than those mentioned above, as it can be seen from the presence of the ripples exhibited by the radial acceleration profile shown in FIG. 5. These high frequency components are due to harmonic contributions of higher order, i.e. to events occurring more than once per tyre turn. For example, a higher order harmonic contribution may be due to the interaction with the ground of the blocks forming the tyre tread. Other higher order harmonic contributions may come from vibrational modes of the whole tyre structure due to the transmission of the deformations to which the tyre is subjected under the contact patch to tyre portions outside of the contact patch. Further high frequency contributions may be caused by the interaction of smaller tread portions with the ground, that may depend on the granularity of the surface (e.g. asphalt) on which the tyre is rolling.

In the arrangement of FIGS. 3a, 3b, the piezoelectric element 313 is excited by such components of the radial acceleration having frequency higher than the frequency of the first harmonic component. The Applicant has verified that when the tyre is rolling at low speed the loading mass 312 associated with the flexible piezoelectric element 313 oscillates around the above mentioned second equilibrium position, i.e. the position reached by the loading mass when pushed by the centrifugal acceleration. Such oscillation, due to the high frequency components (i.e. components due to higher order harmonics and/or components due to interaction between the tyre tread and the road), is very beneficial for the generation of electric charge by piezoelectric effect. Actually, due to such oscillations, a continuous flow of electric charge is generated during the above mentioned first fraction of complete tyre revolution (i.e., the portion outside the contact patch), which, summed to the electric charge generated during the above mentioned second fraction of complete tyre revolution (i.e. the contact patch), contributes to form "continuous" generation of electric charge during the whole tyre turn.

As said, such behavior occurs at low speed. At higher speed, the developed centrifugal acceleration becomes so strong (with respect to the other components forming the radial acceleration) that the loading mass 312 is urged against the inner walls of the housing 313 and any movement of the same is practically inhibited. In such situation, electric charge is anyway generated in the second fraction of complete tyre revolution.

Figure 6:
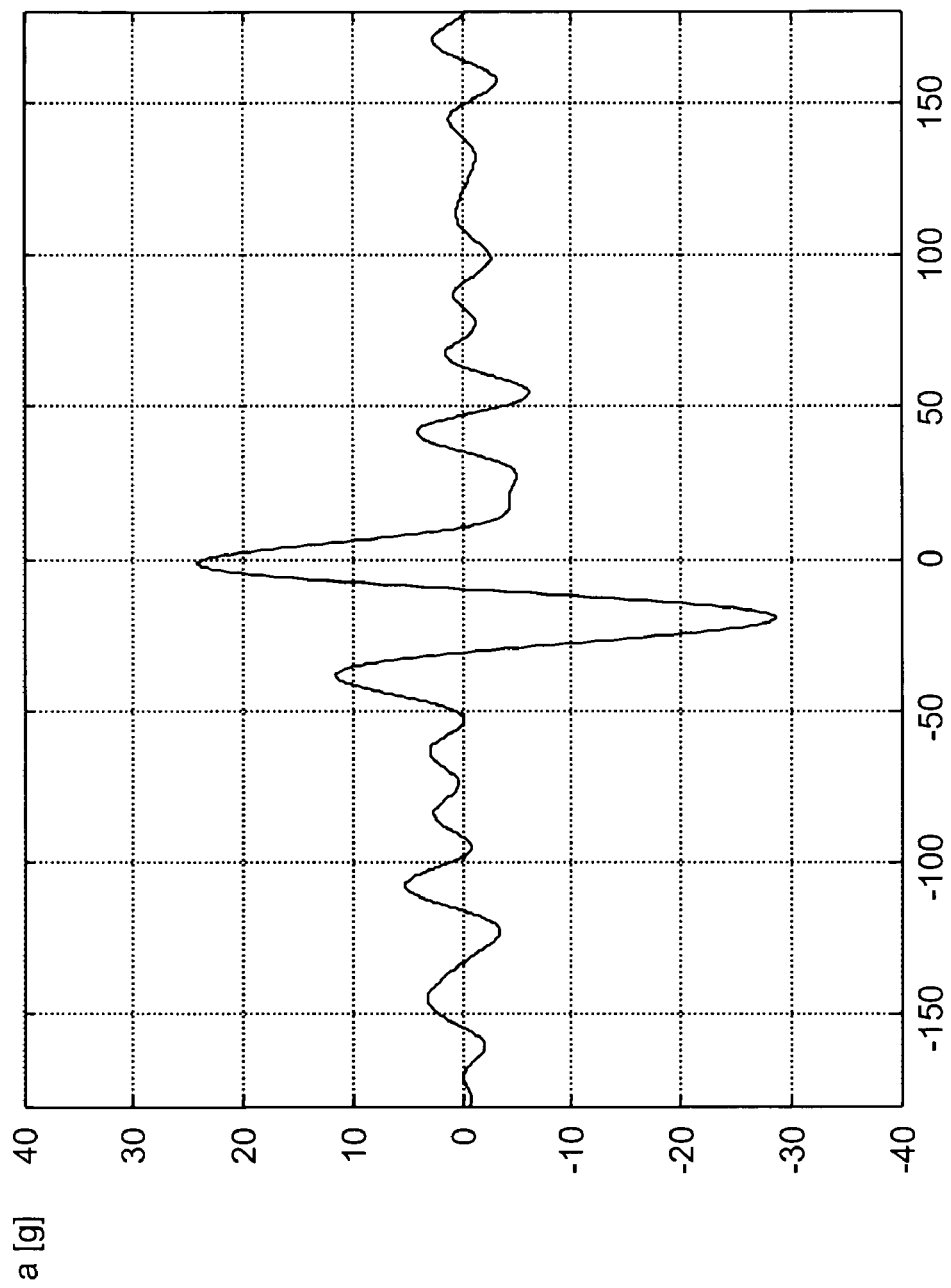
FIG. 6 shows an exemplary profile of longitudinal acceleration to which a crown portion of a tyre is subjected during rolling on road surface.

On the other hand, FIG. 6 shows an exemplary profile of a signal describing a longitudinal acceleration to which a tyre portion associated to the power supply 31 may be subjected during a tyre revolution.

With reference to FIG. 6, in a first fraction of a complete tyre revolution, during which the tyre crown portion associated with the power supply 31 is not in contact with the ground, the longitudinal acceleration is substantially null (if a constant rotation speed of the tyre is considered), except for the high frequency oscillations visible in FIG. 6, the presence of which is due to higher harmonic contributions ad/or vibrations imparted to the tyre structure due to the interaction of the tyre with the ground, being analogous to those already explained with reference to FIG. 5.

In a second fraction of the complete tyre revolution, during which the tyre crown portion associated with the power supply 31 is in contact with the ground, the longitudinal acceleration level shows two well defined peaks having opposite sign, substantially corresponding to the entering and the exiting of the tyre crown portion associated with the power supply 31 into/from the contact patch. The exact disposition of the two peaks (positive peak first and negative peak afterwards or vice versa) depends on the rotation versus of the tyre.

In the arrangement of FIGS. 4a, 4b, the structure comprising the flexible piezoelectric element 313 and the loading mass 312 is subjected to the action of the "impulse" longitudinal acceleration shown in FIG. 6. In practice, each time the tyre crown portion associated with the power supply 31 enters into and exits from the contact patch the structure comprising the flexible piezoelectric element 313 and the loading mass 312 receives an acceleration impulse (corresponding to the positive and negative peaks shown in FIG. 6), causing oscillation of the loading mass 312. In rectilinear driving conditions and at constant speed, substantially no other longitudinal acceleration contributions having intensity comparable to that of the peaks shown in FIG. 6 will disturb or stop the oscillation of the structure comprising the flexible piezoelectric element 313 and the loading mass 312, so that in the remaining portion of tyre revolution outside the contact patch the structure may be substantially free to oscillate. In other words, the structure comprising the piezoelectric element 313 and the loading mass 312 behaves as a forced oscillator, enabled to oscillate in the longitudinal direction of the tyre, and receiving an impulse force at any passage under the contact patch of the tyre crown portion associated with the power supply 31.

Due to the lower intensity of the longitudinal acceleration peaks shown in FIG. 6 with respect to the values reachable in the radial direction (at the same rotation speed), the loading mass 312 is pushed away from its equilibrium position by the longitudinal acceleration to a lower displacement with respect to that obtainable with the centrifugal acceleration, so that the overall excursions of the oscillations of the structure comprising the flexible piezoelectric element 313 and the loading mass 312 are correspondingly lower (at the same rotation speed). However, since the structure comprising the flexible piezoelectric element 313 and the loading mass 312 substantially behaves as a free oscillator when the tyre crown portion associated with the power supply 31 is outside the contact patch, deformation of the flexible piezoelectric element 313 may continue during the whole tyre revolutions, continuously generating electric charge. The extent of the displacement from the equilibrium position reachable by the loading mass 312 grows with the rotation speed of the tyre, up to the maximum allowed by the gap 314.

Resonance phenomena may also occur in certain speed ranges and/or due to the contribution of higher harmonic components of the longitudinal acceleration: in such case the excursion of the forced oscillation may occur to grow up to the maximum allowed by the gap 314, with a maximum generation of electric charge, even at low speed.

Figure 7:
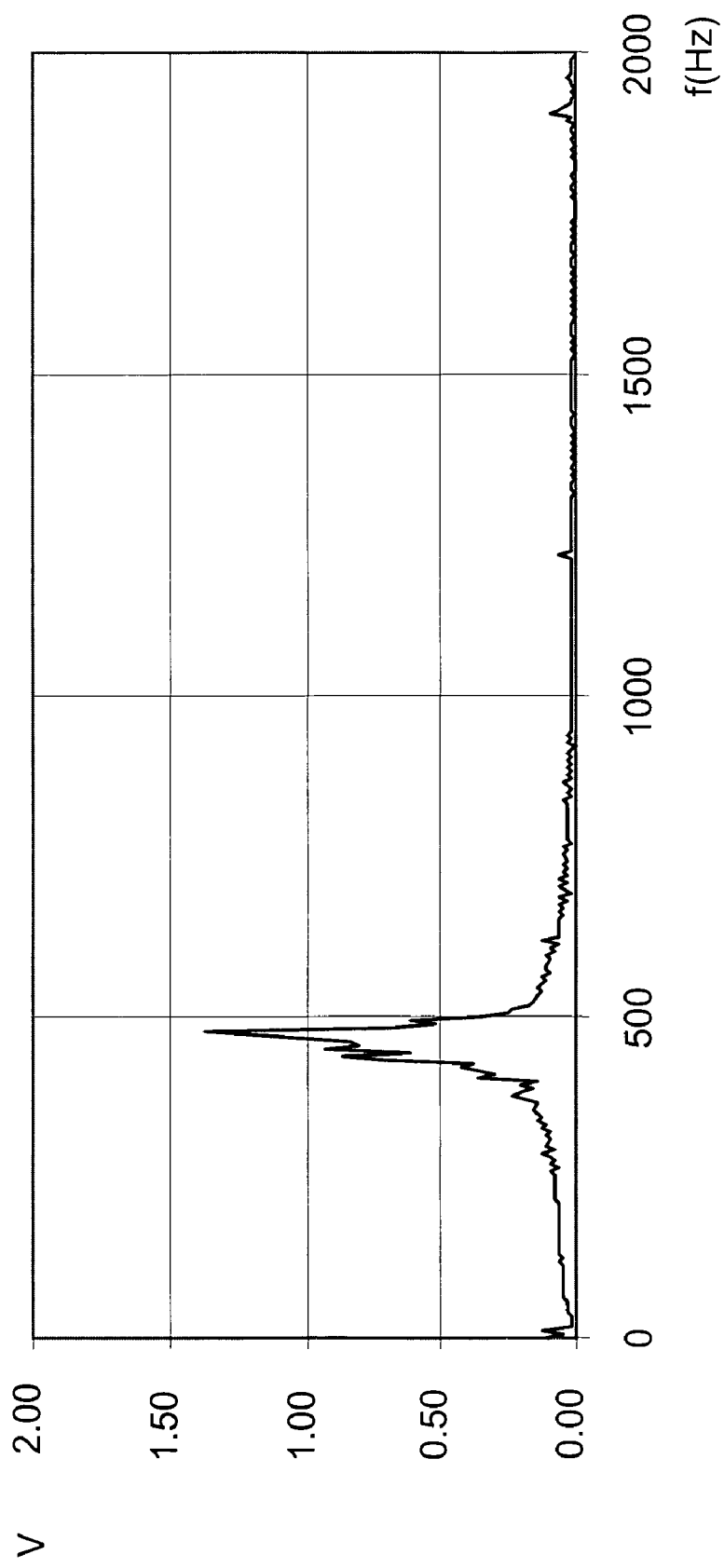
FIG. 7 shows the frequency response of an exemplary oscillating structure comprising a flexible piezoelectric element coupled to a loading mass.

FIG. 7 shows the frequency response of an exemplary oscillating structure comprising a flexible piezoelectric element 313 associated with a loading mass 312, suitable for obtaining an amount of generated electrical energy sufficient for powering electronic circuits adapted for being used within tyres. The dimensions and material of the piezoelectric element 313 were chosen so as to obtain a stiffness k thereof of about 4800 N/m. The loading mass 312 m was sized to about 0.6 grams. In order to obtain the frequency response, the housing comprising the piezoelectric element associated to the loading mass was disposed on a shaker device driven by a control electronics, which applied a pulsed exciting force to the shaker, in a frequency range between 0 Hz and 2000 Hz. The movement of the shaker caused oscillations of the loading mass and of the piezoelectric element, with consequent generation of electric charge. FIG. 7 reports the transfer function of the oscillating structure, versus the frequency the exciting force. As it can be seen from FIG. 5, a resonance peak of the oscillating structure formed by the piezoelectric element and by the loading mass is about 450 Hz. The Applicant has verified that an oscillating structure formed by a flexible piezoelectric element and a loading mass, having a resonance peak within a frequency range between about 150 Hz and 600 Hz and coupled to a crown portion of a tyre, allows the obtaining of an optimal generation of electrical energy together with a good strength and reliability of the oscillating structure, which are desirable features for its employment within a sensor device to be coupled to a tyre.

Figure 8:
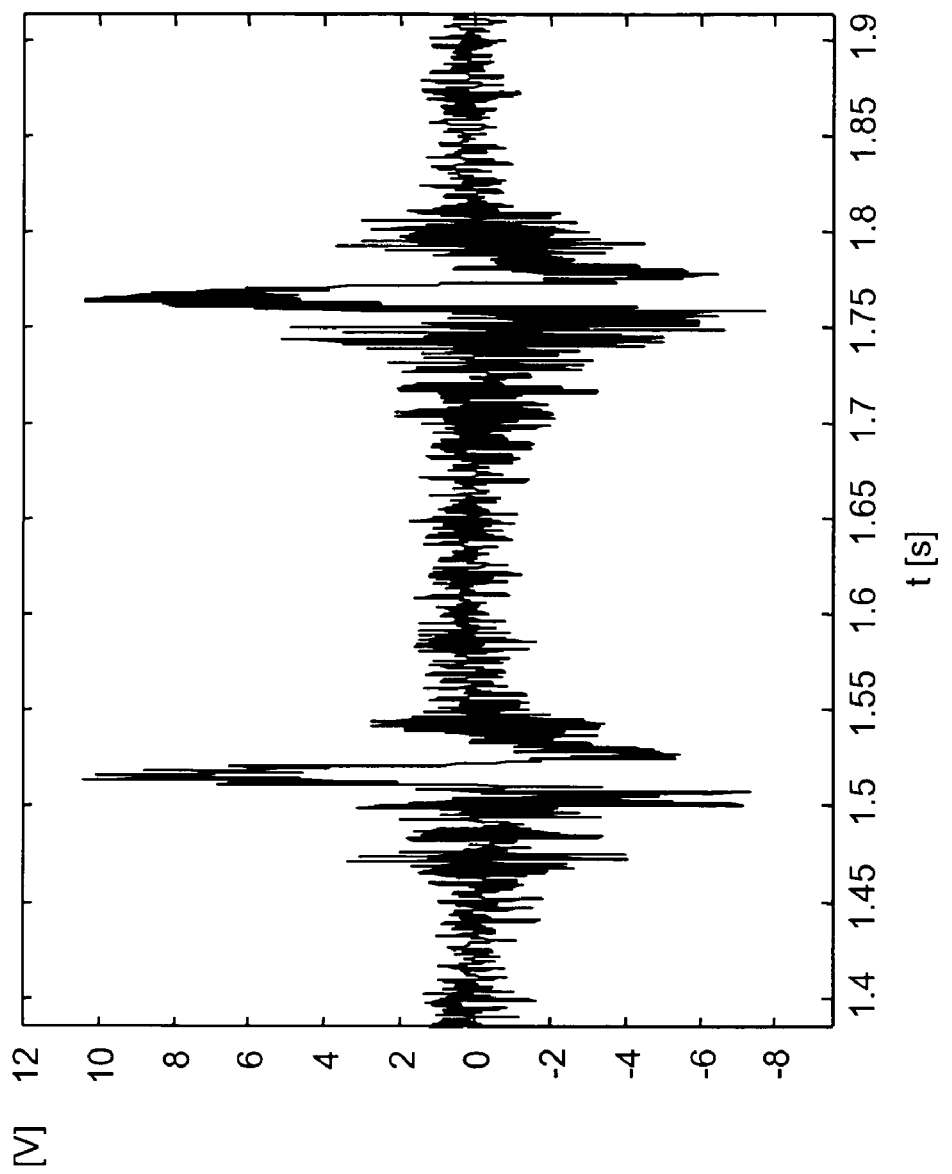
FIGS. 8 and 9 show two exemplary voltage signals obtained across a power supply comprising a flexible piezoelectric element disposed according to the arrangement of FIGS. 3a, 3b.
Figure 9:
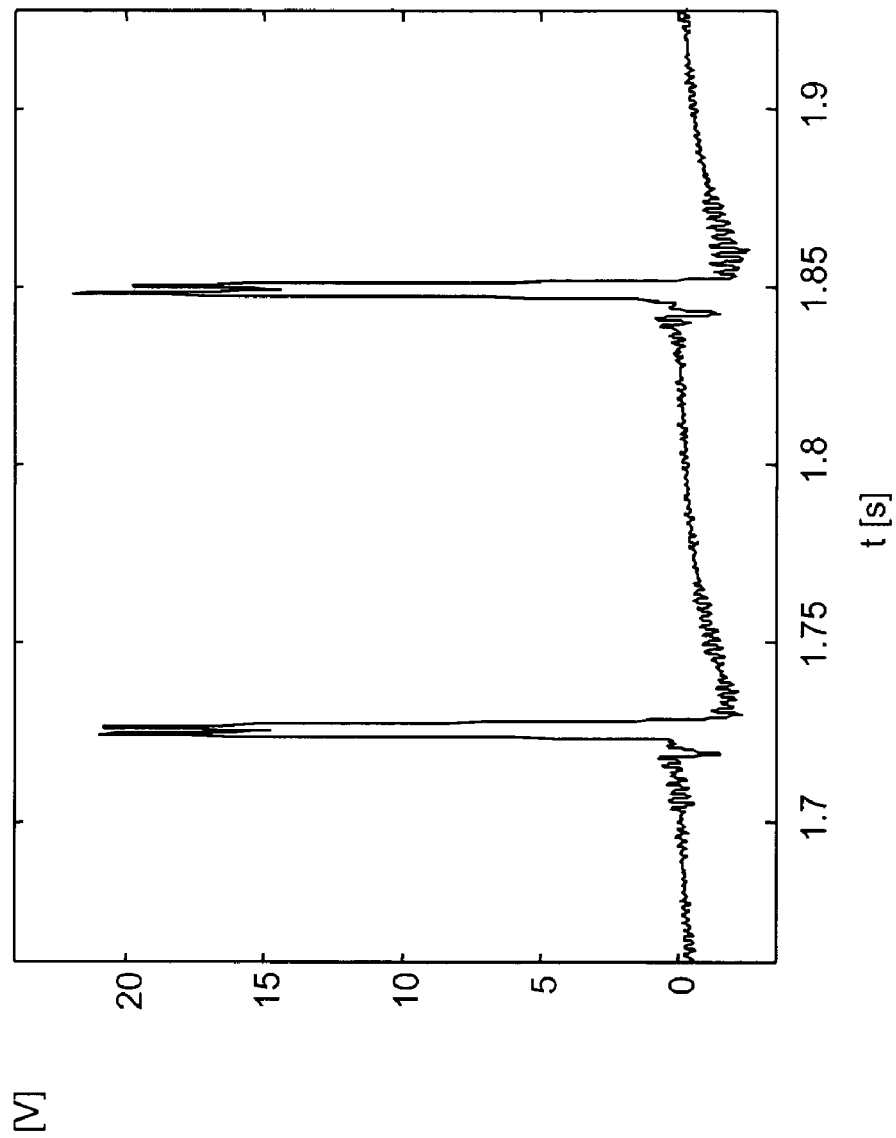
Figure 10:
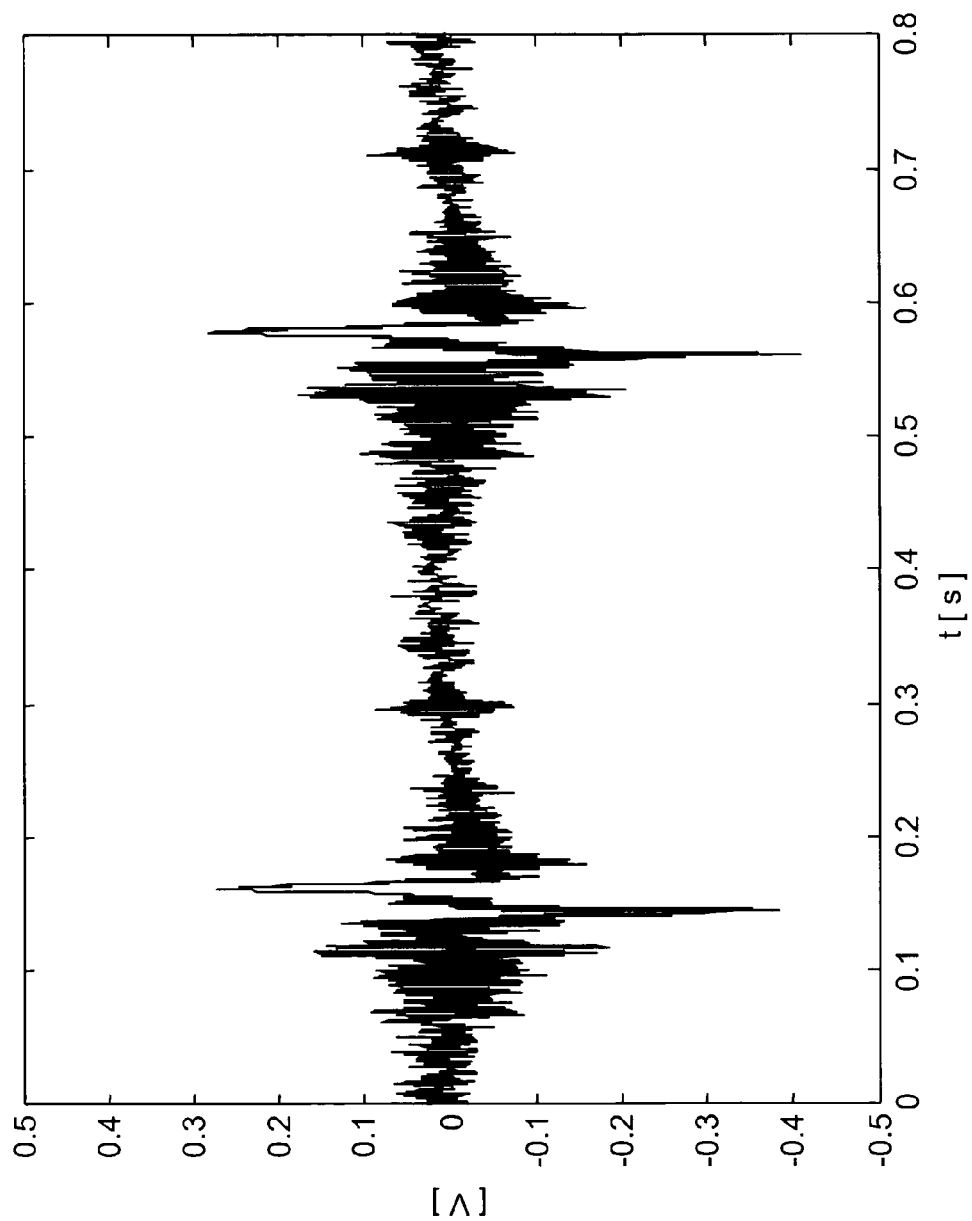
FIGS. 10 and 11 show two exemplary voltage signals obtained across a power supply comprising a flexible piezoelectric element disposed according to the arrangement of FIGS. 4a, 4b.
Figure 11:
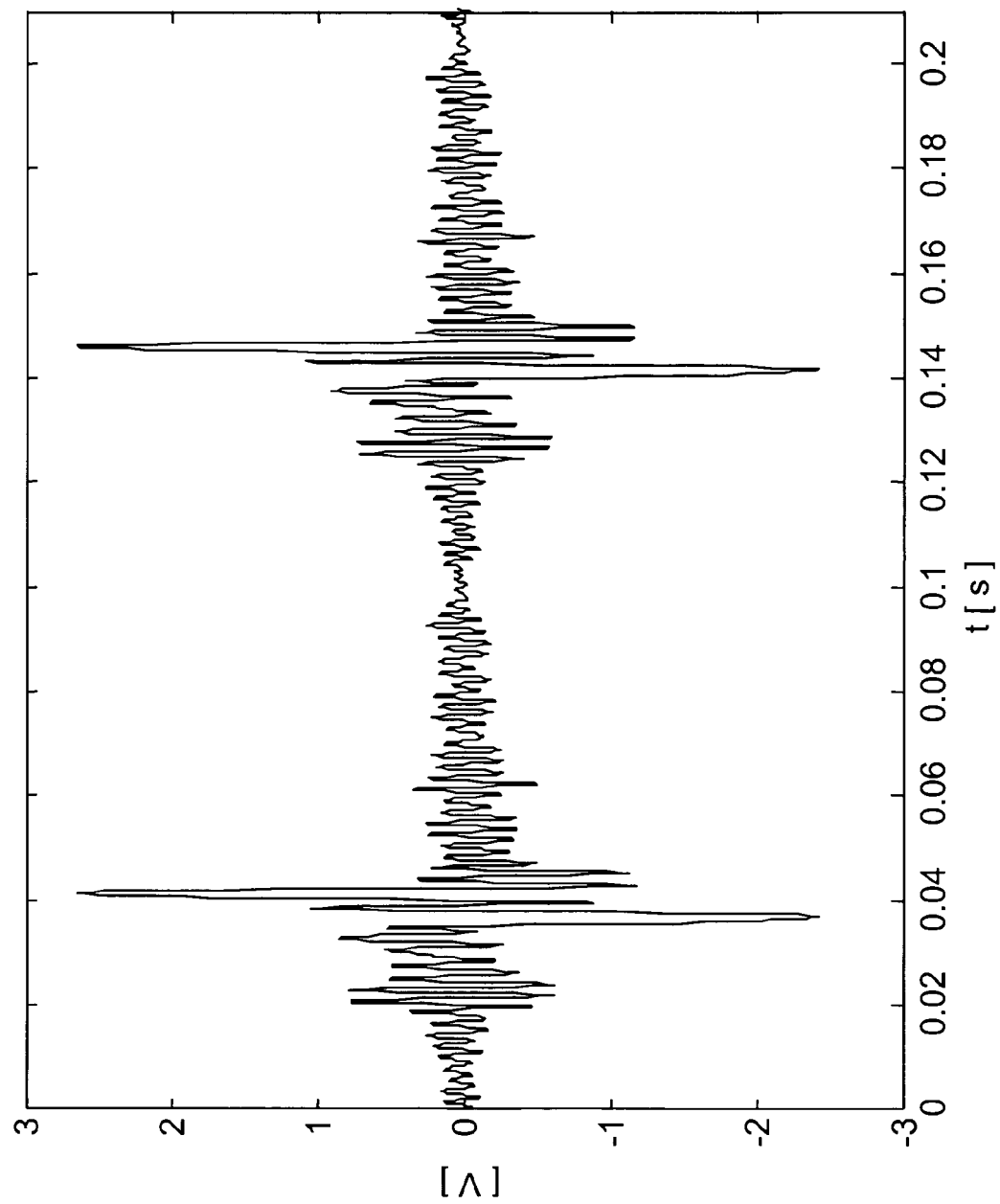

FIG. 8 and FIG. 9 show two examples of the voltage signal versus time measured across a power supply coupled to the inner liner of a tyre as disclosed in FIGS. 3a, 3b (i.e. being subjected to the radial acceleration) whereas FIGS. 10 and 11 show the voltage signal versus time generated across a power supply coupled to the inner liner of a tyre as disclosed in FIGS. 4a, 4b (i.e. being subjected to the longitudinal acceleration). In particular, FIGS. 8 and 10 refer to a measuring performed at a rotation speed of the tyre of 15 rad/s, whereas FIGS. 9 and 11 refer to a measuring performed at a rotation speed of the tyre of 60 rad/s.

The exemplary power supply used in the measuring of FIGS. 8 to 11 was formed by including a bimorph plate of piezoelectric material (PZT), having a width of 4.5 mm, a length of 11 mm, an overall thickness of 0.46 mm in a plastic housing having width of 7 mm, a length of 12 mm, a height of 6.2 mm, a thickness of 1 mm. A loading mass of 0.6 gr. was fixed to the free end of the piezoelectric plate. An overall gap of 200 μm was left between both the inner walls of the housing and the outside surface of the loading mass (100 μm+100 μm).

As it can be seen from FIGS. 8 to 11, the higher peaks (the term "higher" has to be intended in absolute value) of the signal versus time obtained using the oscillating structure comprising the piezoelectric element 313 associated with the loading mass 312 substantially reproduce the peaks in the acceleration profiles of FIGS. 5 and 6, which correspond to the deformations undergone by the portions of the tyre being in contact with the ground (or contact patch). It has to be noticed that in FIGS. 8 and 9 the peak corresponding to the passage under the contact patch of the crown portion associated with the oscillating structure is turned upside-down with respect to that of FIG. 5.

Thus, the signal obtainable across the power supply comprising the above oscillating structure could be used for extracting (by suitable processing) data related to the interaction between the tyre and the road surface.

The extracted data could comprise, for example, the length of the contact region between the tyre and the road surface, which could be estimated based on the position of the higher peaks. By the estimation of the length of the contact region between the tyre and the ground, the load to which the tyre is subjected could also be evaluated, for example by considering known relationships correlating the inflation pressure of the tyre, the load and the length of the contact region. Patent Application no. WO05/042281 in the name of the Applicant (the content of which is herein incorporated by reference) describes a more precise method for determining the load which could also be used, once the length of the contact region between the tyre and the road surface has been estimated.

Other data could also be derived by simple processing of the signal obtained by the above oscillating structure. For example, the number of tyre revolutions could be counted, adding one turn each time the signal reaches its maximum (in absolute value). Furthermore, the angular speed of the tyre could also be derived by the number of revolutions per unit time, and/or the rotation speed (the tyre radius being known). As another example, in case the oscillating structure is coupled to the crown portion of the tyre as in FIGS. 4a, 4b (i.e. being subjected to the longitudinal acceleration), a detection of the sequence negative-positive or positive-negative of the higher peaks could provide a simple and effective indication of the position of the power supply including the oscillating structure in the vehicle (i.e. whether the power supply is included in a left side tyre or in a right side tyre), since the above sequence depends on the rotation versus of the tyre, as explained above with reference to FIG. 6.

In other words, the oscillating structure comprising the flexible piezoelectric element and the loading mass could be advantageously used for providing not only a power supply, but also for providing an effective sensor of the interaction between the tyre and the road surface, as well as of the tyre dynamics. To this purpose, as shown in FIG. 2, the signal obtained by the power supply 31, including the oscillating structure arranged as in FIGS. 3a, 3b or in FIG. 4a, 4b, is fed to the micro-controller 33, and processed by the analysis circuit 39. The processing of the signal is generally aimed at the detection of the major peaks related to the entering and the exiting of the crown portion coupled to the power supply/sensor device in the contact patch.

As it is visible in FIGS. 8 and 10 as respectively compared with FIGS. 9 and 11, the intensity of the major peaks increases (in absolute value) with the rotation speed of the tyre. At high rotation speed these peaks, due to the first harmonic contribution, are well distinguishable from the "noise" caused by the higher order harmonics contributions (vibrations, interactions due to the granularity of the road surface, etc.), as clearly shown, for example, by FIGS. 9 and 11.

On the other hand, at low rotation speed the peaks due to the first harmonic contribution have lower intensity (in absolute value), so that their detection could be hindered by the presence of the higher order harmonics contributions. These higher order harmonics, in fact, could cause excitation of resonant modes in the oscillating structure, i.e. of oscillations of the flexible piezoelectric element coupled to the loading mass of an extent which could become comparable with respect to that caused by the passage under the contact patch of the crown portion coupled to the oscillating structure when the tyre rotates at low speed.

In order to remove the contributions of the higher order harmonics, so as to increase the signal to noise ratio in the signal portion of the peaks due to the first harmonic contribution, a low-pass filtering is applied to the signal when the tyre rotates at low speed. The low-pass filtering should remove at least contributions due to resonant modes, so that the tuning frequency of the low-pass filter could be set to be equal to that of the resonance peak of the oscillating structure (see FIG. 7), or preferably to a lower frequency, for example to the lower frequency corresponding to the width at half of the resonance peak, or, as a further example, to half of the frequency of the resonance peak. In practice, at least for an employment in car tyres, a fixed filtering could be applied for removing all frequency contributions above 120-150 Hz: such frequencies are not reachable by the first harmonic contributions during rotation of a car tyre at low speed. A low-pass filter having a tuning frequency variable according to the rotation speed of the tyre could also be applied, in case very precise measurements are needed.

On the other hand, at higher speed, i.e. when the higher order harmonics contributions cannot practically excite resonant modes causing oscillations of the oscillating structure of an extent comparable with those caused by the first harmonic contribution, a low-pass filtering is not necessary anymore, or is even undesirable. In fact, at high rotation speed the peak of the frequency envelope formed by all harmonic contributions may at least partially superimpose to the resonance peak of the oscillating structure, so that a low-pass filtering could cause a distortion of the filtered signal possibly leading to an incorrect determination of the position of the major peaks.

A threshold for the rotation speed could be properly set by trial and error in order to switch the low-pass filtering off when the threshold speed is reached. In practice, the Applicant has verified that a suitable threshold speed could be set as the speed at which the loading mass begins to touch the inner walls of the housing hosting the oscillating structure during oscillation, for a gap dimension between the loading mass and the inner walls in a range compatible with the need to obtain a high generation of electrical energy for power supplying together with a high reliability of the oscillating structure.

Figure 12:
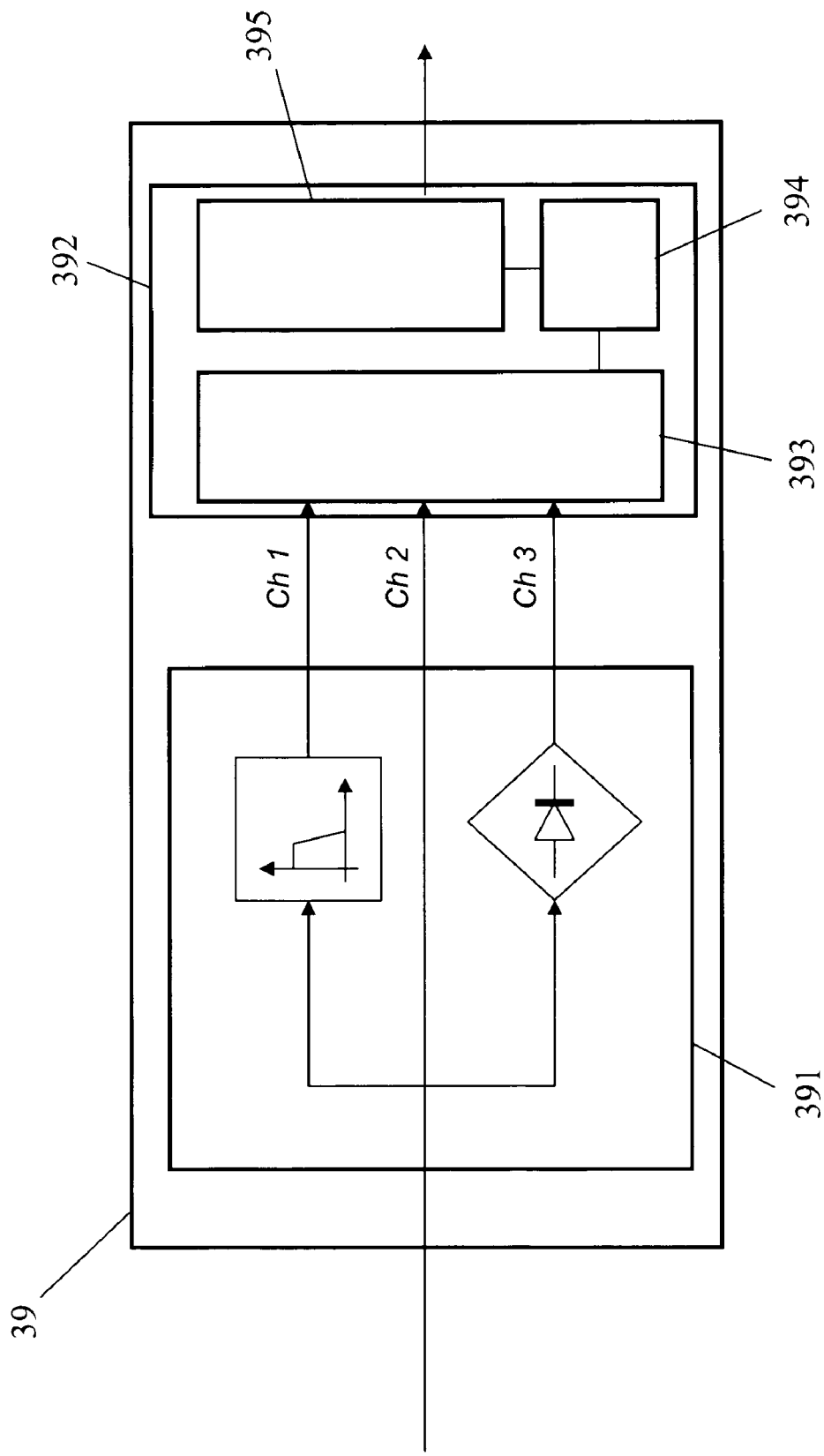
FIG. 12 shows an exemplary analysis circuit which could be used for processing the signal obtained by a power supply comprising the flexible piezoelectric element and the loading mass.

FIG. 12 shows, in functional blocks sufficient for the purposes of the present invention, an exemplary analysis circuit 39 which could be used for processing the signal obtained by the power supply comprising the flexible piezoelectric element and the loading mass. The analysis circuit 39 comprises a conditioning block 391 and a processing block 392. The processing block 392 comprises an analog-to-digital converter 393, a memory 394, a processor 395.

In operation, the signal generated by the power supply 31 (see FIG. 2) during rotation of the tyre is fed to the analysis circuit 39. In particular the generated signal enters the conditioning block 391 of the analysis circuit, which splits the signal onto three output channels, identified as Ch1, Ch2, Ch3 in FIG. 12.

On the first channel Ch1 the signal is low-pass filtered, whereas on the second channel Ch2 the signal is left unaltered. On the third channel Ch3 the signal is rectified, e.g. by passing the same through a rectifier diode bridge. The third channel could be omitted if the rectifying operation is performed via software in the processing block 392.

The low-pass filtered signal of Ch1, the unaltered signal of Ch2 and the rectified signal on Ch3 (if present) are processed in the processing block 392. More particularly, the three signals are sampled and converted in digital format in the analog-to-digital converter 393. The sampled digital signal portions are then stored in the memory 394, to be analyzed and processed according to procedures executed by the processor 395 for extracting data related to the position of the characteristic peaks corresponding to the entering/exiting of the crown portion of the tyre coupled to the power supply 31 into/from the contact patch.

At low speed (i.e. at a rotation speed lower than the threshold speed) the readings are performed on the low-pass filtered signal samples, whereas at high speed (i.e. at a rotation speed higher than the threshold speed) the readings are performed on the unaltered signal samples.

More particularly, when the tyre comprising the power supply begins to rotate, as soon as the electrical energy generated by the power supply is sufficient to power up the sensor device, the readings are performed, by default, on the low-pass filtered signal samples obtained at the first channel Ch1. This is because it is reasonably assumed that the tyre is rotating at low speed at the power up of the self powered sensor device.

A first processing operated on the low-pass filtered signal samples stored in memory 394 is a synchronization operation. With the synchronization, the processor 395 is able to recognize each tyre revolution. Typically, this could be performed by continuously finding the maximum value of the sampled low-pass filtered signal, which identifies, by default, the passage under the contact patch of the tyre portion associated with the power supply. To this purpose, an adaptive threshold scheme could be used. In particular, a first fixed threshold is used at the beginning. The first fixed threshold should be set to be higher than normal "noise" level caused by higher order harmonic contributions at particularly low speed. Each sample is compared with the first fixed threshold: when a given sample V1 reaches the first fixed threshold, a new threshold for the comparison is set to be a predefined percentage a % (e.g. 80%) of V1 (or the maximum between the first fixed threshold and a % times V1). These steps are repeated for every sample, each time storing the maximum value obtained, as well as the related positions in the signal portion under analysis, until a stationary condition is reached in which well "isolated" (i.e. non-consecutive, possibly with a predefined minimum time separation) maximum values are found, corresponding to the recognition of each tyre revolution. This simple processing allows the counting of the tyre revolutions with good precision, and can also be used for subsequent processing. In case the minimum values should also be identified (particularly in case the flexible piezoelectric element flexes under the action of the longitudinal acceleration, as shown in FIGS. 4a, 4b, see also FIGS. 10 and 11, so as a "negative" peak should also be detected), similar operations could be performed starting from a second fixed threshold having an opposite sign with respect to the first fixed threshold.

Once synchronization and peak detection is performed, the stored positions of the maximum and/or minimum values could be used for estimating the angular speed and/or the rotation speed of the tyre (the tyre radius being known, in the latter case), by reciprocating the distance in time between two consecutive maximum (or minimum) positions. The length of the contact region between the tyre and the road surface could also be obtained. In particular, in case the flexible piezoelectric element flexes under the action of the radial acceleration, the length of the contact region can be related to the width of the peak corresponding to the maximum value (see FIG. 5), whereas in case the flexible piezoelectric element flexes under the action of the longitudinal acceleration, the length of the contact region can be related to the distance in time between the positions of the maximum and the minimum signal values (see FIG. 6). Once the length of the contact region between the tyre and the road surface has been estimated, the load exerted on the tyre could also be evaluated, as explained before.

In case the flexible piezoelectric element flexes under the action of the longitudinal acceleration, a further simple analysis of the occurred sequence of the stored consecutive maximum and minimum values used for estimating the length of the contact region between the tyre and the road surface (maximum first and minimum afterwards, or vice versa) can allow to recognize if the self-powered sensor device is comprised within a tyre fitted on the left side or on the right side of a vehicle.

In other words, by simple analysis of the electrical signal generated by the power supply 31, the sensor 3 can "auto-locate" itself as being fitted in the right hand side or in the left hand side of the vehicle. In order to extract this information, the sequence of the signs of the above mentioned characteristic peaks is detected. In fact, as said before with reference to FIG. 6, the positive-negative or negative-positive sequence of the peaks of the longitudinal acceleration representing the entering into or the exiting from the contact patch depends on (and can thus be used as an indication of) the rotation versus of the tyre. Taking the external of a vehicle as a reference, right hand side tyres rotate clockwise, while left hand side tyres rotate counter-clockwise. When the power supply 31 is sensitive to the longitudinal acceleration, the clockwise or counter-clockwise rotation of a tyre (i.e. its fitting position on the vehicle) containing the power supply 31 could be found based on the detection of the sequence of signs of the positive and negative characteristic peaks representing the entering into and the exiting from the contact patch (assuming that the power supply 31 is applied in the right hand side and in the left hand side tyres in the same predetermined way, e.g. with the oscillating end of the flexible piezoelectric element pointing towards the inner sidewall of the tyre). For example, by detection of the fact that the positive peak (derivable by extracting the sign of the maximum signal value) precedes the negative peak (derivable by extracting the sign of the minimum signal value) could correspond to clockwise rotation.

Back to FIG. 12, when the rotation speed becomes high (over a certain threshold speed), the same processing steps disclosed above are performed by the processor 395 on the unaltered signal samples obtained from the second channel Ch2 and stored in memory 394.

The readings on the rectified signal samples (either obtained through the third channel Ch3 in the configuration of FIG. 12, or obtained via software) may be advantageously used by the processor 395 in order to understand if the current rotation speed of the tyre is lower or greater than the threshold speed, in case the reaching of the threshold speed is associated with the condition in which the loading mass coupled to the flexible piezoelectric element begins to touch the inner walls of the housing during oscillation. In this condition, the voltage value reached by the maximum of the generated signal remains substantially unchanged, since the maximum oscillation extent is reached. Thus, for example, the reaching of the threshold speed could be recognized by analyzing the variation of the maximum values of the rectified signal, stored after a maximum recognition procedure using an adaptive threshold similar to that disclosed above (or corresponding to the positions of the maximum values of the low-pass filtered signal or of the unaltered signal samples read on the first or on the second channel already performed). In another approach, the monitoring of a function related to the electrical energy generated at each tyre revolution could be used. The generated electrical energy per tyre revolution, in fact, does not grow anymore when the maximum oscillation of the oscillating structure allowed by the gap is reached. Suitable functions related to a normalized electrical energy per tyre revolution useful for determining "on the fly" (without the need of having a fixed speed threshold) the reaching of the condition of maximum oscillation could be the following ones:

$$IWcr(n) = \sqrt{\frac{\sum_{i=1}^{m}(V(i))^2}{m}}$$

$$IWcr(n) = \frac{\sum_{i=1}^{m}|V(i)|}{m}$$

$$IWcr(n) = \frac{\sum_{i=1}^{m}|V(i)|}{\max(n)}$$

wherein n represents the tyre revolution under analysis, V(i) represents the voltage of each sample of the rectified signal in the tyre revolution under analysis, m represents the number of samples comprised between the beginning and the end of the tyre revolution under analysis, max(n) represents the maximum value reached by the rectified signal in the tyre revolution under analysis. Independently of the exact geometry of the oscillating structure, all the above functions reach a sort of plateau when plotted versus the angular speed of the tyre, in correspondence of the reaching of the condition of maximum allowed oscillation. The detection of this plateau can be thus advantageously used by the processor 395 for recognizing the condition of maximum allowed oscillation (i.e. the threshold speed for switching from the readings on the first channel Ch1 to the second channel Ch2, and vice versa) for any oscillating structure geometry, without the need of complex characterizations of each sensor device in order to find the correct threshold speed.

Exemplary preferred ranges for a self-powered sensor device using a bimorph PZT flexible piezoelectric plate for obtaining the above explained performances may be the following:

length of the PZT plate: from 7 to 20 mm;
width of the PZT plate: from 3 to 18 mm;
overall thickness of the bimorph plate: from 0.15 to 1.20 mm;
loading mass: from 0.05 gr to 4 gr
gap: from 50 to 400 μm.

With particular reference to the loading mass size, it has to be noticed that a low size of the loading mass allows to increase the resonance frequency of the piezoelectric element+loading mass structure. Furthermore, a low size of the loading mass allows reducing an unbalancing caused to the tyre rotation due to the presence of the power supply. Moreover, a low size of the loading mass allows reducing the occurrence of cracks and breakings in the power supplier housings caused by the hits against the inner walls during oscillation. On the other hand, a too low size of the loading mass does not allow sufficient bending of the flexible piezoelectric element, with consequent insufficient generation of electrical charge. A guideline for the dimensioning of the power supplier could be to choose a loading mass size m sufficient to substantially avoid unbalancing of the tyre during rotation (e.g. a mass lower than 4 gr.), to choose a resonance frequency $f_r$ for the piezoelectric element+loading mass structure (e.g. higher than 150 Hz) and then derive the dimensions of the piezoelectric element from its stiffness k, calculated by inverting the following well known relationship:

$$f_r = \frac{1}{2\pi}\sqrt{\frac{k}{m}}$$

The invention claimed is:

1. A method for determining at least one operating parameter of a tyre fitted on a vehicle, comprising:
    providing an oscillating structure comprising a housing and a piezoelectric element coupled to said housing and capable of oscillating in an oscillation direction;
    coupling said oscillating structure to a crown portion of said tyre;
    rotating said tyre on a rolling surface so as to cause oscillation of said oscillating structure, thereby causing said piezoelectric element to generate an electrical signal; and
    processing said electrical signal so as to determine said at least one operating parameter of the tyre,
    wherein said processing of said electrical signal comprises:
        determining whether a rotation speed of said tyre is greater than a threshold speed; and
        in the negative, extracting information for determining said at least one operating parameter of the tyre from a low-pass filtered signal, the low-pass filtered signal being obtained by removing at least frequency components of said electrical signal having a frequency higher than or equal to a resonance peak frequency of said oscillating structure.

2. The method according to claim 1, wherein said piezoelectric element is coupled to said housing so as to have a first end substantially fixed to the housing and a second end fixed to a loading mass.

3. The method according to claim 2, wherein a gap is formed between at least one inner wall of said housing and an outer surface of said loading mass.

4. The method according to claim 1, wherein said crown portion of said tyre is a portion of an inner surface of the tyre.

5. The method according to claim 1, wherein said coupling of said oscillating structure to said crown portion of the tyre is performed so as to dispose a longer side of said piezoelectric element substantially according to an axial direction of the tyre.

6. The method according to claim 1, wherein said coupling of said oscillating structure to said crown portion of the tyre is performed so as to substantially match said oscillation direction with a longitudinal direction of the tyre.

7. The method according to claim 1, wherein said coupling of said oscillating structure to said crown portion of the tyre is performed so as to substantially match said oscillation direction with a radial direction of the tyre.

8. The method according to claim 1, further comprising extracting information for determining said at least one operating parameter of the tyre from said electrical signal in case said rotation speed is higher than said threshold speed.

9. The method according to claim 1, wherein said processing of said low-pass filtered signal or of said electrical signal is performed so as to extract information related to at least one characteristic peak of said low-pass filtered signal or of said electrical signal, said at least one characteristic peak being related to an entering of the crown portion of said tyre coupled to the oscillating structure in a contact region between the tyre and a rolling surface, and to an exiting of the crown portion of said tyre coupled to the oscillating structure from said contact region.

10. The method according to claim 9, wherein said information related to said at least one characteristic peak comprises a distance between predetermined points of said at least one characteristic peak.

11. The method according to claim 10, wherein said at least one operating parameter of the tyre comprises a length of said contact region between the tyre and the rolling surface, and wherein said length of said contact region is determined based on an extracted distance between predetermined points of said at least one characteristic peak.

12. The method according to claim 9,
    wherein said coupling of said oscillating structure to said crown portion of the tyre is performed so as to substantially match said oscillation direction with a longitudinal direction of the tyre; and
    wherein said at least one characteristic peak comprises a positive characteristic peak and a negative characteristic peak, wherein said processing of said low-pass filtered signal or of said electrical signal is performed so as to extract information related to said positive and said negative characteristic peaks, and wherein said information related to said positive and said negative characteristic peaks comprises a sequence of signs of said positive and said negative characteristic peaks.

13. The method according to claim 12, wherein said at least one operating parameter of the tyre comprises a fitting position of the tyre on the vehicle, and wherein said fitting position of the tyre is determined based on an extracted sequence of signs.

14. The method according to claim 9, wherein said at least one operating parameter of the tyre comprises a number of tyre revolutions performed by said tyre during rolling in a given time period, and wherein said number of tyre revolutions is determined by counting an occurrence of said at least one characteristic peak during said given time period.

15. The method according to claim 1, further comprising measuring an inflation pressure of said tyre.

16. The method according to claim 15,
wherein said processing of said low-pass filtered signal or of said electrical signal is performed so as to extract information related to at least one characteristic peak of said low-pass filtered signal or of said electrical signal, said at least one characteristic peak being related to an entering of the crown portion of said tyre coupled to the oscillating structure in a contact region between the tyre and a rolling surface, and to an exiting of the crown portion of said tyre coupled to the oscillating structure from said contact region;
wherein said information related to said at least one characteristic peak comprises a distance between predetermined points of said at least one characteristic peak; and
wherein said at least one operating parameter of the tyre comprises a load to which said tyre is subjected, and wherein said load is determined based on said distance between predetermined points of said at least one characteristic peak and the measured inflation pressure.

17. The method according to claim 1, wherein said low-pass filtered signal is obtained by removing frequency components having a frequency higher than or equal to half the resonance peak frequency of said oscillating structure.

18. The method according to claim 1, wherein a resonance peak frequency of said oscillating structure is higher than 150 Hz.

19. The method according to claim 18, wherein said low-pass filtered signal is obtained by removing frequency components having a frequency higher than 120 Hz.

20. The method according to claim 1, wherein said determining whether the rotation speed of said tyre is greater than the threshold speed comprises detecting a condition of maximum allowed oscillation of said oscillating structure.

21. A system for determining at least one operating parameter of a tyre fitted on a vehicle comprising:
an oscillating structure coupled to a crown portion of said tyre, the oscillating structure comprising a housing and a piezoelectric element coupled to said housing and capable of oscillating in an oscillation direction; and
a processing device capable of being adapted to process an electrical signal generated by said piezoelectric element so as to determine said at least one operating parameter of the tyre,
wherein said processing device comprises an analysis circuit capable of being adapted to:
determine whether a rotation speed of said tyre is greater than a threshold speed; and
in the negative, extract information for determining said at least one operating parameter of the tyre from a low-pass filtered signal, the low-pass filtered signal being obtained by removing at least frequency components of said electrical signal having a frequency higher than or equal to a resonance peak frequency of said oscillating structure.

22. The system of claim 21, wherein said flexible piezoelectric element is coupled to said housing so as to have a first end substantially fixed to the housing and a second end fixed to a loading mass.

23. The system according to claim 22, wherein a gap is formed between at least one inner wall of said housing and an outer surface of said loading mass.

24. The system according to claim 23, wherein said gap has a maximum extent of 400 μm.

25. The system according to claim 22,
wherein said flexible piezoelectric element is coupled to said housing so as to have a first end substantially fixed to the housing and a second end fixed to a loading mass; and
wherein said loading mass is lower than 4 grams.

26. The system according to claim 22,
wherein said flexible piezoelectric element is coupled to said housing so as to have a first end substantially fixed to the housing and a second end fixed to a loading mass; and
wherein said loading mass is U-shaped.

27. The system according to claim 21, wherein said crown portion of said tyre is a portion of an inner surface of the tyre.

28. The system according to claim 21, wherein the oscillating structure is coupled to said crown portion of the tyre so as to dispose a longer side of said piezoelectric element substantially according to an axial direction of the tyre.

29. The system according to claim 21, wherein the oscillating structure is coupled to said crown portion of the tyre so as to substantially match said oscillation direction with a longitudinal direction of the tyre.

30. The system according to claim 21, wherein the oscillating structure is coupled to said crown portion of the tyre so as to substantially match said oscillation direction with a radial direction of the tyre.

31. The system according to claim 21, wherein said analysis circuit is further capable of being adapted to extract information for determining said at least one operating parameter of the tyre from said electrical signal in case said rotation speed is higher than said threshold speed.

32. The system according to claim 21, wherein said analysis circuit is further capable of being adapted to extract information related to at least one characteristic peak of said low-pass filtered signal or of said electrical signal, said at least one characteristic peak being related to an entering of the crown portion of said tyre coupled to the oscillating structure in a contact region between the tyre and a rolling surface, and to an exiting of the crown portion of said tyre coupled to the oscillating structure from said contact region.

33. The system according to claim 32, wherein said information related to said at least one characteristic peak comprises a distance between predetermined points of said at least one characteristic peak.

34. The system according to claim 33, wherein said at least one operating parameter of the tyre comprises a length of said contact region between the tyre and the rolling surface, and wherein said processing device is capable of being adapted to determine said length of said contact region based on an extracted distance between predetermined points of said at least one characteristic peak.

35. The system according to claim 32,
wherein the oscillating structure is coupled to said crown portion of the tyre so as to substantially match said oscillation direction with a longitudinal direction of the tyre; and
wherein said at least one characteristic peak comprises a positive characteristic peak and a negative characteristic peak, wherein said analysis circuit is capable of being adapted to extract information related to said positive and said negative characteristic peaks, and wherein said information related to said positive and said negative characteristic peaks comprises a sequence of signs of said positive and said negative characteristic peaks.

36. The system according to claim 35, wherein said at least one operating parameter of the tyre comprises a fitting position of the tyre on the vehicle, and wherein said processing device is capable of being adapted to determine said fitting position of the tyre based on an extracted sequence of signs.

37. The system according to claim 32, wherein said at least one operating parameter of the tyre comprises at number of tyre revolutions performed by said tyre during rolling in a given time period, and wherein said processing device is capable of being adapted to determine said number of tyre revolutions by counting an occurrence of said at least one characteristic peak during said given time period.

38. The system according to claim 21, further comprising a measurement device coupled to said processing device, wherein said measurement device comprises at least one pressure sensor.

39. The system according to claim 38,
wherein said analysis circuit is further capable of being adapted to extract information related to at least one characteristic peak of said low-pass filtered signal or of said electrical signal, said at least one characteristic peak being related to an entering of the crown portion of said tyre coupled to the oscillating structure in a contact region between the tyre and a rolling surface, and to an exiting of the crown portion of said tyre coupled to the oscillating structure from said contact region;
wherein said information related to said at least one characteristic peak comprises a distance between predetermined points of said at least one characteristic peak; and
wherein said at least one operating parameter of the tyre comprises a load to which said tyre is subjected, and wherein said processing device is capable of being adapted to determine said load based on said distance between predetermined points of said at least one characteristic peak and an inflation pressure measured by said pressure sensor.

40. The system according to claim 38, wherein said measurement device comprises a temperature sensor.

41. The system according to claim 38, wherein said measurement device comprises an acceleration sensor.

42. The system according to claim 21, wherein said low-pass filtered signal is obtained by removing frequency components having a frequency higher than or equal to half the resonance peak frequency of said oscillating structure.

43. The system according to claim 21, wherein a resonance peak frequency of said oscillating structure is higher than 150 Hz.

44. The system according to claim 43, wherein said resonance peak frequency is higher than 200 Hz.

45. The system according to claim 44, wherein said resonance peak frequency is higher than 300 Hz.

46. The system according to claim 43, wherein said low-pass filtered signal is obtained by removing frequency components having a frequency higher than 120 Hz.

47. The system according to claim 21, wherein said analysis circuit is capable of being adapted to determine whether the rotation speed of said tyre is greater than the threshold speed based on a detection of a condition of maximum allowed oscillation of said oscillating structure.

48. The system according to claim 21, wherein said piezoelectric element is a bimorph element.

49. The system according to claim 21, wherein said piezoelectric element is a planar element.

50. The system according to claim 21, further comprising:
a transmitter device capable of being coupled to said processing device, and capable of being adapted to transmit the at least operating parameter of the tyre determined by said processing device; and
a receiving device capable of being adapted to receive the transmitted at least one operating parameter of the tyre.

51. The system according to claim 21, further comprising a voltage preparation circuit capable of being adapted for storing electrical energy associated with said electrical signal, and capable of being coupled to said oscillating structure and to said processing device.

52. The system according to claim 51, wherein said voltage preparation circuit comprises a capacitor.

* * * * *